(12) United States Patent
Lee et al.

(10) Patent No.: US 12,489,836 B2
(45) Date of Patent: Dec. 2, 2025

(54) ELECTRONIC DEVICE COMPRISING ANTENNA

(71) Applicant: SAMSUNG ELECTRONICS CO., LTD., Suwon-si (KR)

(72) Inventors: Kyungjae Lee, Suwon-si (KR); Sungkoo Park, Suwon-si (KR); Himchan Yun, Suwon-si (KR); Soonho Hwang, Suwon-si (KR); Jaebong Chun, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 426 days.

(21) Appl. No.: 18/070,470

(22) Filed: Nov. 29, 2022

(65) Prior Publication Data

US 2023/0086173 A1 Mar. 23, 2023

Related U.S. Application Data

(63) Continuation of application No. PCT/KR2022/006112, filed on Apr. 28, 2022.

(30) Foreign Application Priority Data

Apr. 28, 2021 (KR) .................. 10-2021-0055155

(51) Int. Cl.
*H04M 1/02* (2006.01)
*H01Q 1/24* (2006.01)

(52) U.S. Cl.
CPC .......... *H04M 1/0216* (2013.01); *H01Q 1/243* (2013.01); *H04M 1/0268* (2013.01)

(58) Field of Classification Search
CPC ... H04M 1/0216; H04M 1/0268; H01Q 1/243
See application file for complete search history.

(56) References Cited

U.S. PATENT DOCUMENTS 7,456,794 B2   11/2008   Sakamoto et al.
9,525,201 B2   12/2016   Ganswindt et al.
(Continued)

FOREIGN PATENT DOCUMENTS

CN   209593488 U   11/2019
CN   211557294 U   9/2020
(Continued)

OTHER PUBLICATIONS

The extended European search report for EP Application No. 22796184.4 mailed on Aug. 22, 2024.
(Continued)

*Primary Examiner* — Myron Wyche
(74) *Attorney, Agent, or Firm* — CANTOR COLBURN LLP

(57) ABSTRACT

An electronic device includes first and second housings, a flexible display, a hinge structure, a hinge cover, and a wireless communication circuit. The first housing includes a first conductive portion, the hinge cover may be positioned opposing the flexible display with respect to the hinge structure when the housings are in a folded state, and the second housing includes a second conductive portion. When the housing are folded, the hinge cover is exposed to the outside of the electronic device by a first width while being disposed between the first edge of the first housing and the second edge of the second housing, and in the folded state, the wireless communication circuit feeds a first point of the hinge cover and transmits and/or receives a signal in a first frequency band, through a first electrical path formed in the first conductive portion and/or the second conductive portion by the feeding.

19 Claims, 20 Drawing Sheets

(56) References Cited

U.S. PATENT DOCUMENTS

| | | | |
|---|---|---|---|
| 11,211,961 | B2 | 12/2021 | Noh et al. |
| 11,411,592 | B2 | 8/2022 | Lee et al. |
| 11,432,418 | B2 | 8/2022 | Yoon et al. |
| 11,626,455 | B2 | 4/2023 | Kim et al. |
| 11,800,667 | B2 | 10/2023 | Oh et al. |
| 2009/0128424 | A1 | 5/2009 | Suzuki et al. |
| 2010/0285851 | A1 | 11/2010 | Horihata et al. |
| 2011/0273346 | A1 | 11/2011 | Nekozuka |
| 2013/0241781 | A1* | 9/2013 | Breiter .................. H01Q 1/243 343/702 |
| 2020/0076062 | A1 | 3/2020 | Lee et al. |
| 2020/0076065 | A1 | 3/2020 | Zhou |
| 2020/0136231 | A1 | 4/2020 | Lee et al. |
| 2020/0195336 | A1 | 6/2020 | Raghavan et al. |
| 2020/0333855 | A1 | 10/2020 | Kim et al. |

FOREIGN PATENT DOCUMENTS

| | | | |
|---|---|---|---|
| CN | 109687125 | | 10/2020 |
| CN | 109167153 | B | 3/2021 |
| JP | 2007-324839 | A | 12/2007 |
| JP | 2009171045 | A | 7/2009 |
| JP | 2010-130201 | A | 6/2010 |
| KR | 10-0885815 | B1 | 2/2009 |
| KR | 20200027734 | A | 3/2020 |
| KR | 20200072190 | A | 6/2020 |
| KR | 10-2020-0092586 | A | 8/2020 |
| KR | 20200101253 | A | 8/2020 |
| KR | 10-2020-0121518 | A | 10/2020 |
| KR | 10-2021-0031309 | A | 3/2021 |
| KR | 10-2021-0041156 | A | 4/2021 |
| WO | 2020122598 | A1 | 6/2020 |
| WO | WO2020122598 | * | 6/2020 .......... H04M 1/0216 |

OTHER PUBLICATIONS

International Search Report mailed Aug. 8, 2022 for PCT/KR2022/006112.

Korean Notice of Allowance for KR Application No. 10-2021-0055155 mailed on May 10, 2025, citing the above reference(s).

* cited by examiner

<Conceptual diagram>       <Equivalent diagram>

ELECTRONIC DEVICE COMPRISING ANTENNA

CROSS-REFERENCE TO RELATED APPLICATIONS

This application is a continuation of International Application No. PCT/KR2022/006112 designating the United States, filed on Apr. 28, 2022, in the Korean Intellectual Property Receiving Office and claiming priority to Korean Patent Application No. 10-2021-0055155, filed on Apr. 28, 2021, in the Korean Intellectual Property Office, the disclosures of which are incorporated by reference herein in their entireties.

BACKGROUND

Field

Embodiments disclosed herein relate to an electronic device including an antenna.

Description of Related Art

In line with development of mobile communication technologies, there has been widespread use of an electronic device including an antenna. The electronic device may use the antenna to transmit and/or receive radio frequency ("RF") signals including voice signals or data (for example, messages, photographs, videos, music files, or games).

The electronic device may include a foldable electronic device. For example, a housing of the foldable electronic device may include a first housing, a second housing, and a hinge structure connecting the first and second housings. The foldable 5 electronic device can be folded or unfolded around the hinge structure and thus may provide a user with improved portability and usability.

SUMMARY

A foldable electronic device may include an antenna (for example, inverted-F antenna) using a side member. For low-frequency band communication, the side member (or side frame) may be desirable to have a physical length corresponding to the low-frequency band, and the electronic device may have difficulty in securing the physical length of the side member.

In addition, when the foldable electronic device is in a folded state, antennas using the side member may interfere with each other, thereby degrading the antenna radiation efficiency. For example, the foldable electronic device may include a first housing and a second housing, and may include a first antenna using a first side member of the first housing and a second antenna using a second side member of the second housing. In an example, the first and second housings may be superimposed when the foldable electronic device is in a folded state, and the first and second antennas may thus interfere with each other, thereby degrading the radiation efficiency.

Furthermore, when the user holds the foldable electronic device, a part of the user's body (for example, hand) may cover a side member, and the influence of the user's body may degrade the radiation efficiency of the antenna using the side member.

According to various embodiments disclosed herein, a hinge cover exposed to the outside of an electronic device when the electronic device is in a folded state and a conductive part of a housing adjacent to the hinge cover may be used antennas such that the influence of a human body and the interference between the antennas are reduced, thereby reducing or preventing antenna radiation efficiency degradation. An electronic device according to various embodiments of the disclosure may include a housing including a first housing and a second housing, a flexible display disposed in the housing, a hinge structure disposed in the inner space of the electronic device, and a wireless communication circuit disposed in the inner space of the electronic device, wherein the first housing may include a first conductive portion corresponding to a first edge parallel to the first axis and adjacent to the first axis, the housing and the flexible display may form an inner space of the electronic device, the hinge structure may connect the first housing and the second housing to each other such that the first housing is rotatable about a first axis with respect to the second housing, the hinge cover may be positioned opposing the flexible display with respect to the hinge structure when the housing is in a folded state, and may cover at least portion of the hinge structure, the second housing may include a second conductive portion corresponding to a second edge parallel to the first axis and adjacent to the first axis, in a state in which the housing is folded, the hinge cover may be exposed to the outside of the electronic device by a first width between the first edge of the first housing and the second edge of the second housing, in a state in which the housing is unfolded, the first edge of the first housing and the second edge of the second housing may be in contact with each other or adjacent to each other within a specific distance shorter than the first width, the hinge cover may be positioned between the housing and the hinge structure, in the folded state, and the wireless communication circuit may feed a first point of the hinge cover and may transmit and/or receive a signal in a first frequency band, through a first electrical path formed in the first conductive portion and/or the second conductive portion according to the feeding.

An electronic device according to various embodiments of the disclosure may include a metal housing including a first metal housing and a second metal housing, a flexible display disposed in the metal housing, a hinge structure disposed in the inner space of the electronic device, a hinge cover, and a wireless communication circuit disposed in the inner space of the electronic device, wherein the metal housing and the flexible display may form an inner space of the electronic device, the hinge structure may connect the first metal housing and the second metal housing to each other such that the first metal housing is rotatable about a first axis with respect to the second metal housing, the hinge cover may be positioned, with respect to the hinge structure, in a second direction opposite to a first direction facing toward the flexible display from the hinge structure, and may cover at least a portion of the hinge structure, the first metal housing may include a first portion corresponding to a first edge adjacent to the first axis, the second metal housing may include a second portion corresponding to a second edge adjacent to the first axis, in a state in which the metal housing is folded, the hinge cover may be exposed to the outside of the electronic device by a first width between the first edge of the first metal housing and the second edge of the second metal housing, in a state in which the metal housing is unfolded, the first edge of the first metal housing and the second edge of the second metal housing may be in contact with each other or adjacent to each other within a specific distance shorter than the first width, the hinge cover may be positioned between the metal housing and the hinge structure, the wireless communication circuit, in the folded state, may feed one point of the hinge cover and may transmit and/or receive a signal in a first frequency band, based on a first electrical path formed in the first portion and/or the second portion according to the feeding, and may transmit and/or receive a signal in a second frequency band, through a second electrical path including the hinge cover.

According to various embodiments disclosed herein, an electronic device may minimize the influence of a human body and interference between antennas, thereby effectively reducing or preventing antenna radiation efficiency degradation.

In addition, according to various embodiments, an electronic device may implement a multi-band antenna having broadband characteristics by using 5 conductive parts of a hinge cover and a housing.

Various other advantageous effects identified explicitly or implicitly through the disclosure may be provided.

DETAILED DESCRIPTION

Hereinafter, various embodiments of the disclosure will be described with reference to the accompanying drawings. However, this is not intended to limit the disclosure to specific embodiments and it should be understood that the embodiments of the disclosure include various modifications, equivalents, or alternatives.

Figure 1:
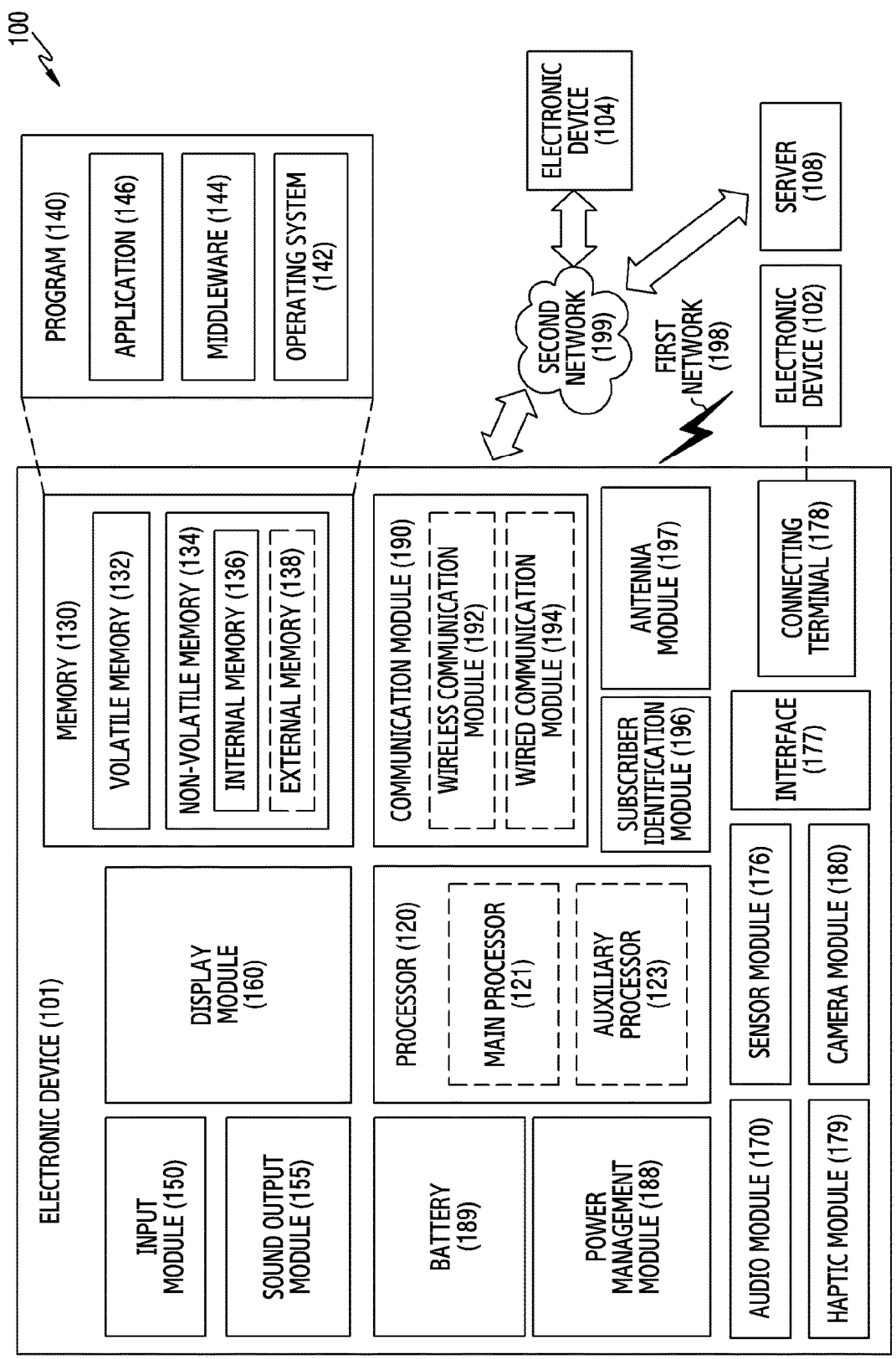
FIG. 1 is a block diagram of an electronic device in a network environment, according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., by wire connection) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., by wire connection) or wirelessly. According to an embodiment, the interface 177 may include, for example, a high-definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196. The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., about 0.5 milliseconds (ms) or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board ("PCB")). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
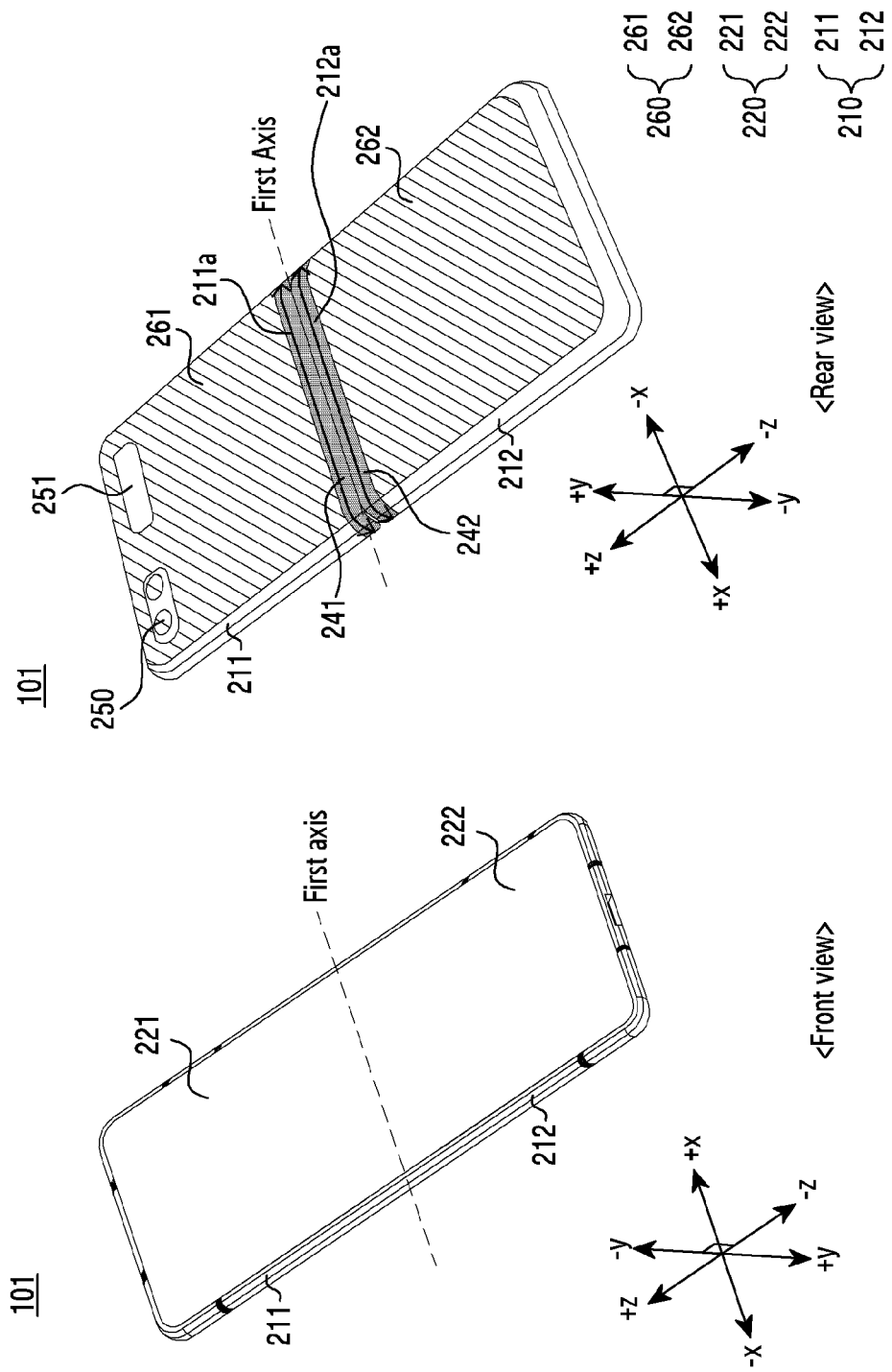
FIG. 2A illustrates front and rear surfaces of an electronic device in an unfolded state according to an embodiment.

FIG. 2A illustrates front and rear surfaces of an electronic device in an unfolded state according to an embodiment.

Referring to FIG. 2A, an electronic device 101 according to an embodiment may include a housing 210, a flexible display 220 disposed in the housing 210, and/or a rear cover 260. In this document, a surface on which the flexible display 220 is disposed is defined as a front surface of the electronic device 101. A surface opposite to the front surface is defined as a rear surface of the electronic device 101. In addition, a surface surrounding a space between the front surface and the rear surface is defined as a side surface of the electronic device 101.

In an embodiment, the housing 210 may include a first housing 211 and a second housing 212. The first housing 211 and the second housing 212 may form a portion of the rear surface and at least a portion of the side surface of the electronic device 101. In an embodiment, the first housing 211 and/or the second housing 212 may include a conductive material (e.g., metal).

According to an embodiment, the rear cover 260 may be coupled to the housing 210 to form the rear surface of the electronic device 101. For example, a first rear cover 261 may be coupled to the first housing 211, and a second rear cover 262 may be coupled to the second housing 212. In an example, the first housing 211, the first rear cover 261, the second housing 212 and the second rear cover 262 may form at least a portion of the rear surface of the electronic device 101. In an embodiment, the housing 210 of the electronic device 101 is configured to be separated from the rear cover 260, but in another embodiment, the housing 210 may be integrally formed with the rear cover 260.

In an embodiment, the rear cover 260 may include an insulation material (e.g., a plastic resin). In another embodiment, the rear cover 260 may include a conductive material (e.g., aluminum).

According to an embodiment, the first housing 211 and the second housing 212 may be disposed on opposite sides with reference to a folding axis (e.g., a first axis) parallel to the x-axis, and may have a symmetrical shape overall with respect to the folding axis (e.g., the first axis). However, the first housing 211 and the second housing 212 are not limited to a symmetrical shape and may have an asymmetrical shape with respect to the folding axis (e.g., the first axis).

According to an embodiment, the electronic device 101 may be in an unfolded state, a folded state, and/or an intermediate state. In an embodiment, the state of the electronic device 101 may vary according to a distance or angle formed between the first housing 211 and the second housing 212. For example, a state in which the first housing 211 and the second housing 212 are disposed at an angle of 180 degrees may be the unfolded state.

As still another example, a state in which the first housing 211 and the second housing 212 are disposed to face each other may be the folded state. As still another example, a state in which the first housing 211 and the second housing 212 are disposed to form a certain angle with each other may be the intermediate state. The certain angle may be greater than the angle between the first housing 211 and the second housing 212 formed in the folded state and smaller than the angle formed in the unfolded state. However, the specific angles, mentioned above, formed by the first housing 211 and the second housing 212 in the folded state and the unfolded state are an example for convenience of description and are not limited thereto.

In an embodiment, the first housing 211 may include a first edge 211a which is adjacent to the folding axis (e.g., the first axis) and substantially parallel to the folding axis, and the second housing 212 may include a second edge 212a which is adjacent to the folding axis (e.g., the first axis) and substantially parallel to the folding axis. In an embodiment, when the electronic device 101 is in an unfolded state, the first edge 211a of the first housing 211 and the second edge 212a of the second housing 212 may be in contact with each other or be spaced apart from each other with a specific distance therebetween.

According to an embodiment, the first housing 211 may include a first conductive portion 241. In an embodiment, the first conductive portion 241 may correspond to the first edge 211a of the first housing 211. For example, the first conductive portion 241 may be formed along the first edge 211a of the first housing 211.

According to an embodiment, the second housing 212 may include a second conductive portion 242. In an embodiment, the second conductive portion 242 may correspond to the second edge 212a of the second housing 212. For example, the second conductive portion 242 may be formed along the second edge 212a of the second housing 212.

In an embodiment, when the electronic device 101 is in an unfolded state, the first conductive portion 241 and the second conductive portion 242 may be in contact with each other or be spaced apart from each other with a specific distance therebetween.

The first conductive portion 241 and the second conductive portion 242 shown in FIG. 2A are an example for convenience of description, and the first conductive portion 241 and the second conductive portion 242 may have various sizes and shapes in another embodiment.

In an embodiment, at least a portion of each of the first housing 211 and the second housing 212 may be formed of a non-metal material or a metal material (e.g., aluminum) having a stiffness selected to support the flexible display 220.

In an embodiment, the housing 210, the rear cover 260, and the flexible display 220 may form an inner space in which various components (e.g., a printed circuit board or a battery) of the electronic device 101 can be disposed.

According to an embodiment, the flexible display 220 may be disposed in the housing 210. For example, the flexible display 220 may be stably placed in a recess formed by the housing 210 and form a great part of the front surface of the electronic device 101. In an embodiment, the flexible display 220 may include a first region 221 and a second region 222. The first region 221 and the second region 222 of the flexible display 220 may be divided based on the first axis about which the electronic device 101 is folded or unfolded. Region division of the flexible display 220 shown in FIG. 2A is an example, and in another embodiment, the flexible display 220 may be divided into two or more regions according to a structure or function. For example, when the electronic device 101 is folded around a folding axis (e.g., the first axis), the flexible display 220 may be divided into a folding region having a specific curvature, a first region 221 adjacent to the first housing 211, and a second region 222 adjacent to the second housing 212. The folding region may be located between the first region 221 and the second region 222. The first region 221 and the second region 222 may have a symmetrical shape overall with respect to the folding axis (e.g., the first axis).

According to an embodiment, the first region 221 and the second region 222 of the flexible display 220 may have a different arrangement structure according to the state of the electronic device 101. For example, when the electronic device 101 is in an unfolded state, the first region 221 and the second region 222 of the flexible display 220 may form an angle of 180 degrees with each other and face in the same direction (e.g., the −y direction).

As another example, when the electronic device 101 is in a folded state, the first region 221 and the second region 222 of the flexible display 220 may form a narrow angle (e.g., between 0 to 10 degrees) and face each other. As another example, when the electronic device 101 is in an intermediate state, the first region 221 and the second region 222 of the flexible display 220 may form an angle greater than that formed in a folded state and smaller than that formed in an unfolded state. In this case, at least a portion of the flexible display 220 may have a curved surface having a specific curvature, and the curvature may be smaller than that in the folded state.

However, the specific angles formed by the first region 221 and the second region 222 in the above-described folded state and unfolded state are an example for convenience of description and are not limited thereto.

According to an embodiment, the electronic device 101 may include a camera hole 250 and/or a sub-display 251. In an embodiment, the camera hole 250 may correspond to a hole through which at least one lens of the camera module 180 is exposed. Light from the outside of the electronic device 101 may be incident to the camera module 180 disposed inside the electronic device 101 through the camera hole 250. In an embodiment, when the electronic device 101 is in a folded state, the sub-display 251 may display a designated object (e.g., the current time, the remaining battery percentage of the electronic device 101).

In the drawings, an embodiment that the first edge 211a of the first housing 211 and the second edge 212a of the second housing 212 are raised to +y direction in a folded state is illustrated.

Figure 2B:
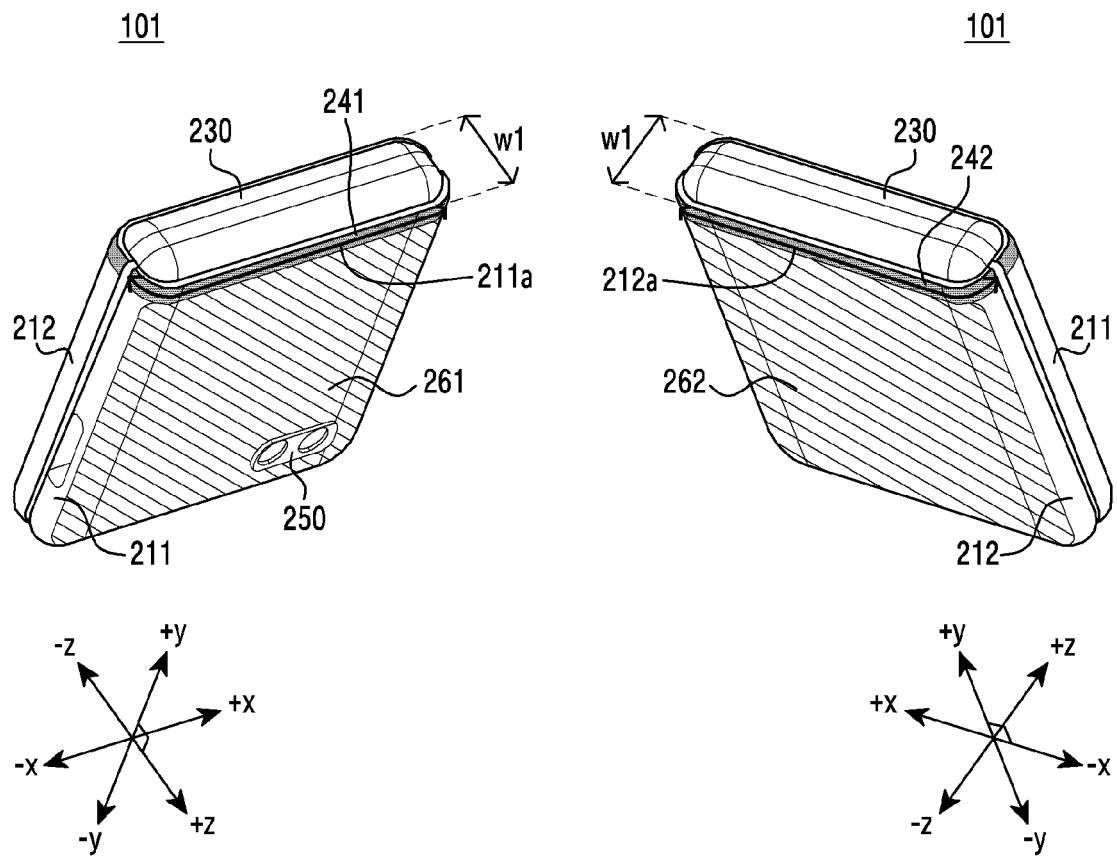
FIG. 2B illustrates perspective views of an electronic device in a folded state according to an embodiment.

FIG. 2B illustrates perspective views of an electronic device in a folded state according to an embodiment.

Referring to FIG. 2B, the electronic device 101 according to an embodiment may include a hinge cover 230. The hinge cover 230 may be disposed between the first housing 211 and the second housing 212 to cover an internal component (e.g., a hinge structure).

In an embodiment, at least a portion of the hinge cover 230 may be covered by a portion of the first housing 211 and the second housing 212 or exposed to the outside according to the state of the electronic device 101. For example, when the electronic device 101 is in an unfolded state, the hinge cover 230 may be covered by the first housing 211 and the second housing 212 so as not to be exposed (See FIG. 5A). As another example, when the electronic device 101 is in a folded state, the hinge cover 230 may be exposed to the outside while being disposed between the first housing 211 and the second housing 212 with a first width w1 as shown in FIG. 2B. As still another example, in a case of an intermediate state in which the first housing 211 and the second housing 212 are folded with a certain angle therebetween, the hinge cover 230 may be partially exposed to the outside while being disposed between the first housing 211 and the second housing 212. A width of the portion of the hinge cover 230 exposed to the outside in the intermediate state (measured in the z direction) may be shorter than a width (e.g., the first width w1) of a portion thereof exposed to the outside in the folded state. In an embodiment, the hinge cover 230 may include a curved surface. In an embodiment, the hinge cover 230 may include a conductive material (e.g., aluminum).

In an embodiment, an internal structure between the hinge cover 230 and the first conductive portion 241 is not shown in the drawing, but in practice, the first conductive portion 241 may be spaced apart from the hinge cover 230 by a specific distance. As another example, in practice, the second conductive portion 242 may be spaced apart from the hinge cover 230 by a specific distance. However, the hinge cover 230 may be spaced apart from the first conductive portion 241 and the second conductive portion 242 within a distance range that the same can be electromagnetically connected thereto through coupling as described later in FIG. 5B.

Figure 2C:
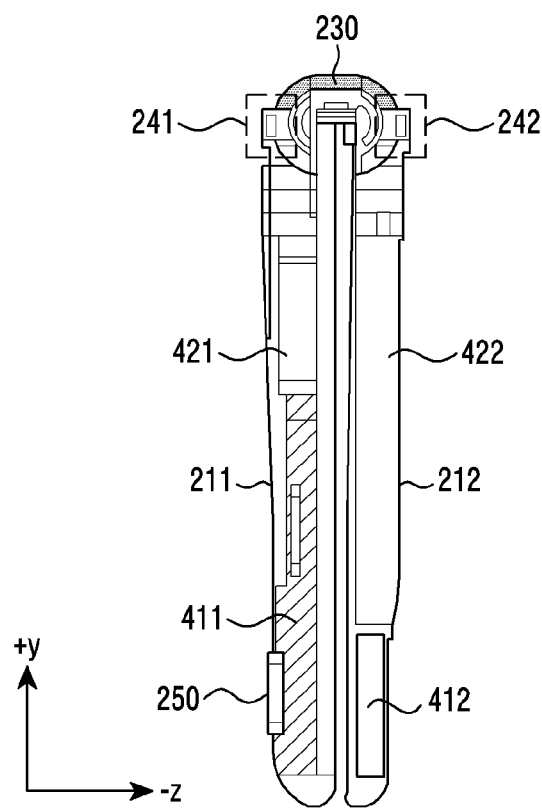
FIG. 2C is an internal structural diagram of an electronic device in a folded state when viewed in the −x direction, according to an embodiment.

FIG. 2C is an internal structural diagram of an electronic device in a folded state when viewed in the −x direction.

FIG. 2C illustrates an arrangement structure of the hinge cover 230, the first conductive portion 241, and the second conductive portion 242 in the electronic device 101 according to an embodiment. In an embodiment, the electronic device 101 may include a first printed circuit board 411 and/or a first battery 421 disposed inside the first housing 211, and the electronic device 101 may include a second printed circuit board 412 and/or a second battery 422 disposed inside the second housing 212. A detailed description of the first printed circuit board 411, the second printed circuit board 412, the first battery 421, and the second battery 422 will be given later in detail with reference to FIG. 4A.

Figure 3:
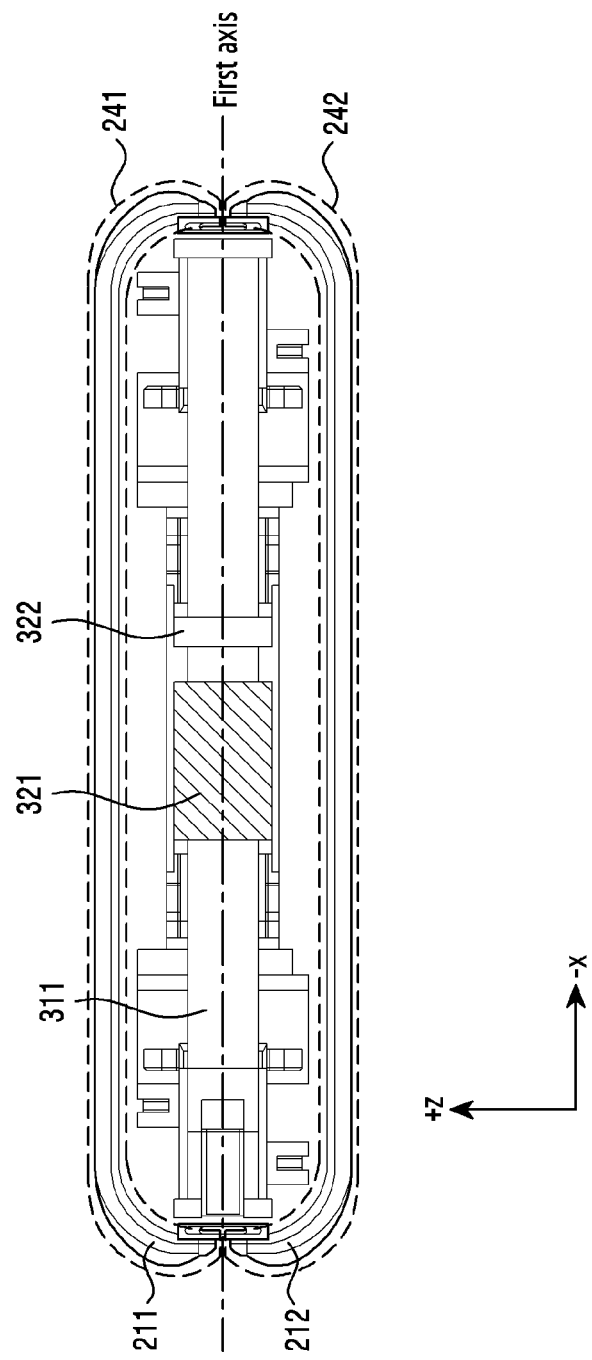
FIG. 3 illustrates an electronic device from which a hinge cover is removed, when the electronic device is in a folded state and viewed in a −y direction, according to an embodiment.

FIG. 3 illustrates an electronic device from which a hinge cover is removed, when the electronic device is in a folded state and viewed in a −y direction, according to an embodiment.

Referring to FIG. 3, the electronic device 101 according to an embodiment may include a hinge structure 311. The hinge structure 311 may connect the first housing 211 and the second housing 212 to each other such that the second housing 212 is rotatable with respect to the first housing 211 about a folding axis (e.g., the first axis).

According to an embodiment, the electronic device 101 may include a first connection member 321 and/or a second connection member 322. In an embodiment, the first connection member 321 and/or the second connection member 322 may include a flexible RF cable (FRC). In another embodiment, the first connection member 321 and/or the second connection member 322 may be implemented as various connection members. For example, the first connection member 321 and/or the second connection member 322 may be implemented as a flexible printed circuit board (FPCB).

In an embodiment, the first connection member 321 and/or the second connection member 322 may electrically connect an electronic component (e.g., a first printed circuit board) disposed in the first housing 211 and an electronic component (e.g., a second printed circuit board) disposed in the second housing 212 to each other, as will be described later with reference to FIG. 4A.

Since FIG. 3 illustrates the electronic device 101 from which the hinge cover 230 is removed, the hinge structure 311, the first connection member 321, and/or the second connection member 322 are viewed. In practice, however, when the electronic device 101 is in a folded state, the hinge structure 311, the first connection member 321, and/or the second connection member 322 may be covered by the hinge cover 230 and thus may not be viewed from the outside.

Figure 4A:
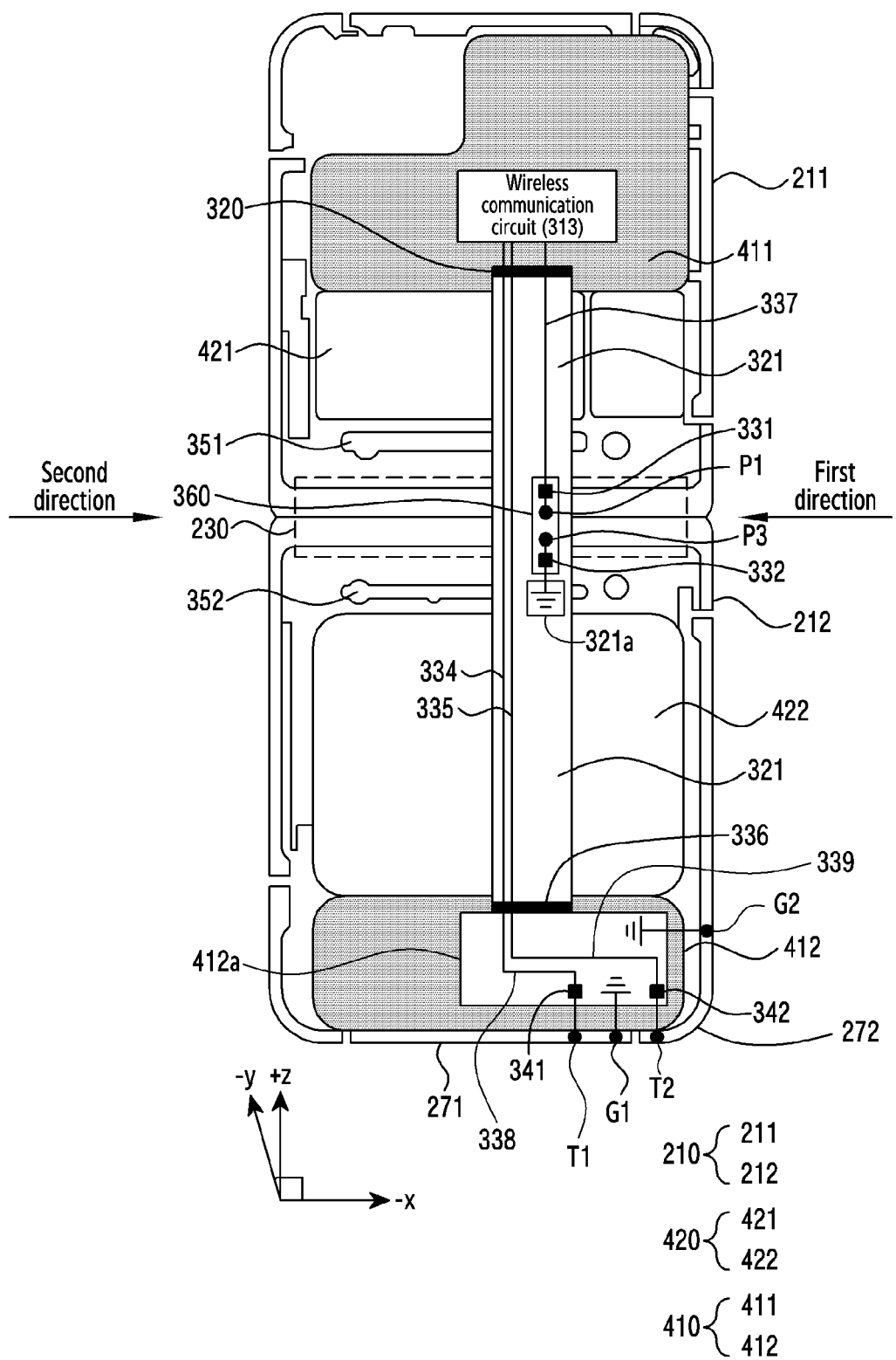
FIG. 4A illustrates an electrical connection relationship between electronic components inside an electronic device when the electronic device is in an unfolded state, according to an embodiment.

FIG. 4A illustrates an electrical connection relationship between electronic components inside an electronic device when the electronic device is in an unfolded state, according to an embodiment. Here, the first direction in the drawings corresponds to −x direction, and the second direction in the drawings corresponds to +x direction.

Referring to FIG. 4A, the electronic device 101 according to an embodiment may include a printed circuit board 410, and the printed circuit board 410 may include a first printed circuit board 411 and/or a second printed circuit board 412. A plurality of electronic components may be disposed on the printed circuit board 410. For example, even though not illustrated in FIGS. 4A and 4B, a processor 120, a memory 130, a control circuit, and/or an interface 177 may be disposed on the printed circuit board 410. In an embodiment, the printed circuit board 410 may be formed of a material (e.g., FR4) having a non-bending property. According to another embodiment, the printed circuit board 410 may be a flexible circuit board (FPCB) having a bendable property (or "flexible property"). A battery 420 according to an embodiment may include a first battery 421 and/or a second battery 422, and the first battery 421 may be disposed inside the first housing 211, and the second battery 422 may be disposed inside the second housing 212. The battery 420 may store power used for the electronic device 101 and may be integrally disposed inside the electronic device 101 or be disposed to be detachable from the electronic device 101.

In an embodiment, the first connection member 321 (e.g., an FPCB) may electrically connect the first printed circuit board 411 and the second printed circuit board 412 to each other. For example, the first connection member 321 may be electrically connected to a first connector 320 of the first printed circuit board 411 and a second connector 336 of the second printed circuit board 412. FIG. 4A shows that the first connection member 321 is positioned above (e.g., in the −y direction) the hinge cover 230 for the explanation of the first connection member 321, but in practice, the first connection member 321 may be disposed to pass through a first groove 351 of the first housing 211 and a second groove 352 of the second housing 212. Accordingly, the first connection member 321 may be positioned under (e.g., +y direction) the hinge cover 230. The positional relationship between the first connection member 321 and the hinge cover 230 will be specifically illustrated and described in FIG. 5A.

According to an embodiment, the first connection member 321 may include at least one transmission line. For example, the first connection member 321 may include a first transmission line 334, a second transmission line 335, and/or a third transmission line 337. In an example, the first transmission line 334, the second transmission line 335, and/or the third transmission line 337 may correspond to an electrical connection line for transmitting and/or receiving an RF signal. In an embodiment, the first connection member 321 may further include a power line for supplying power to a switching circuit 331 to be described later, and a control line for controlling the switching circuit 331.

In an embodiment, the second printed circuit board 412 may include a feeding circuit unit 412a. In an embodiment, the feeding circuit unit 412a may include a first ground. The second printed circuit board 412 may further include an additional ground in addition to the first ground. The feeding circuit unit 412a may include a fourth transmission line 338 and a fifth transmission line 339. In an embodiment, the second printed circuit board 412 may include a first matching element 341 and/or a second matching element 342.

In an embodiment, the fourth transmission line 338 may be connected to the first matching element 341 for impedance matching, and the fifth transmission line 339 may be connected to the second matching element 342 for impedance matching. In an embodiment, the first matching element 341 and/or the second matching element 342 may include a lumped element (e.g., a capacitor or an inductor).

The position and range of the feeding circuit unit 412a in the second printed circuit board 412 illustrated in FIG. 4A is only an example for convenience of description and are not limited thereto.

According to an embodiment, the electronic device 101 may include a wireless communication circuit 313. For example, the wireless communication circuit 313 may be disposed on the first printed circuit board 411. In an embodiment, the wireless communication circuit 313 is disposed on the first printed circuit board 411, but is not limited thereto, and in another embodiment, the wireless communication circuit 313 may be disposed on the second printed circuit board 412.

According to an embodiment, the wireless communication circuit 313 may feed a third conductive portion 271 of the second housing 212 through the first transmission line 334 and the fourth transmission line 338 and may transmit and/or receive an RF signal in a specified frequency band through this route. For example, the wireless communication circuit 313 may feed a first feeding point T1 of the third conductive portion 271, and the third conductive portion 271 may be electrically connected to the first ground of a feeding circuit unit 412a at its first ground point G1. In an example, the wireless communication circuit 313 may transmit and/or receive an RF signal in a specified frequency band, using an electrical path from the first feeding point T1 to the first grounding point G1. In an embodiment, the third conductive portion 271 of the second housing 212 may form a portion of the side surface of the electronic device 101.

In an embodiment, the wireless communication circuit 313 may feed a fourth conductive portion 272 of the second housing 212 through the second transmission line 335 and the fifth transmission line 339 and may transmit and/or receive an RF signal in a specified frequency band through this route. For example, the wireless communication circuit 313 may feed a second feeding point T2 of the fourth conductive portion 272, and the fourth conductive portion 272 may be electrically connected at a second grounding point G2 to the first ground of the feeding circuit unit 412a. In an example, the wireless communication circuit 313 may transmit and/or receive an RF signal in a specified frequency band, using an electrical path from the second feeding point T2 to the second grounding point G2. In an embodiment, the fourth conductive portion 272 of the second housing 212 may form a portion of a corner or the side surface of the electronic device 101.

According to an embodiment, the electronic device 101 may include a matching circuit 331 for impedance matching, and the matching circuit 331 may be disposed on the first connection member 321. In an embodiment, the matching circuit 331 may include a lumped element (e.g., a capacitor or an inductor) and/or a switching circuit therein.

According to an embodiment, the wireless communication circuit 313 may be connected to a first point P1 of the first connection member 321 through the third transmission line 337. For example, the wireless communication circuit 313 may be electrically connected to the first point P1 of the first connection member 321 through the third transmission line 337 connected to the matching circuit 331. In an example, the first point P1 may correspond to one point required when the wireless communication circuit 313 feeds one point (e.g., the second point (P2)) of the hinge cover 230.

According to an embodiment, the first connection member 321 may include a second ground 321a. The position and range of the second ground 321a in the first connection member 321 shown in FIG. 4A is only an example for convenience of description and are not limited thereto. To be used as an antenna ground, the second ground 321a may have a range wider than that shown in FIG. 4A.

According to an embodiment, the first connection member 321 may include a second ground 321a, and the second ground 321a may be used as a ground of the hinge cover 230 used as an antenna radiator. For example, the hinge cover 230 may be electrically connected at a third point P3 to the first connection member 321, and the third point P3 may be electrically connected to the second ground 321*a* through the switching circuit 332 in a selective manner. For example, the hinge cover 230 may be electrically connected to the second ground 312*a* in a selective manner. In an embodiment, the switching circuit 332 may correspond to a circuit disposed in a grounding path of the antenna radiator (e.g., the hinge cover 230) for the purpose of impedance matching.

According to an embodiment, the first connection member 321 may include a circuit region 360 including the first point P1 for feeding the matching circuit 331, the switching circuit 332, and the hinge cover 230, and a third point P3 for grounding. A connection relationship of the circuit region 360 will be described in detail with reference to FIG. 4C.

Figure 4B:
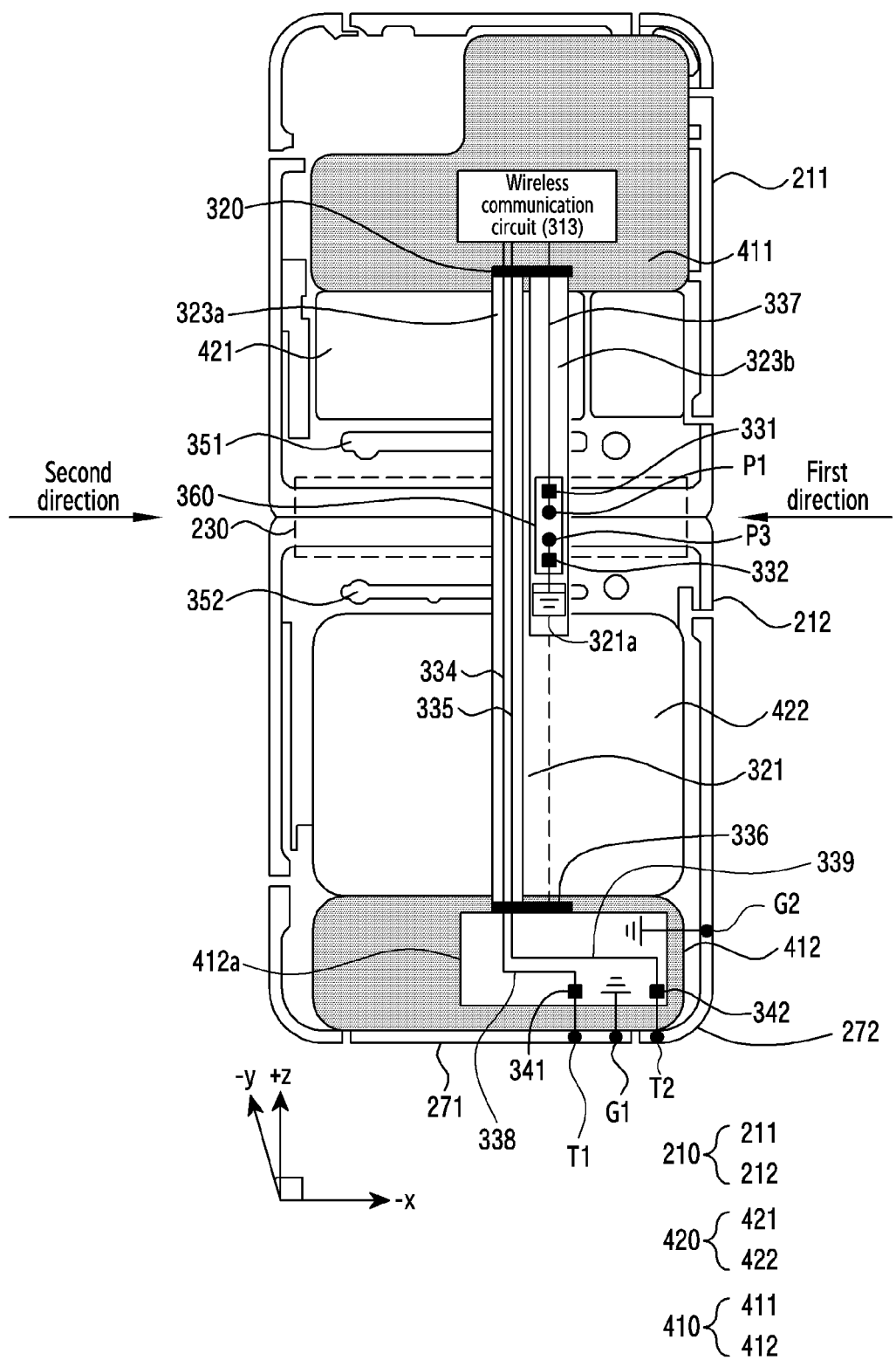
FIG. 4B illustrates another embodiment of the first connection member of FIG. 4A according to an embodiment.

FIG. 4B illustrates another embodiment of the first connection member of FIG. 4A according to an embodiment.

Referring to FIG. 4B, the electronic device 101 according to an embodiment may include a first additional connection member 323*a* and/or a second additional connection member 323*b* electrically connecting the first printed circuit board 411 and the second printed circuit board 412 to each other. In an embodiment, the first additional connection member 323*a* may include a first transmission line 334 and/or a second transmission line 335, and the second additional connection member 323*b* may include a third transmission line 337.

In comparison between FIGS. 4A and 4B, each of the first additional connection member 323*a* and the second additional connection member 323*b* in FIG. 4B according to an embodiment may correspond to a portion of the first connection member 321 in FIG. 4A.

In another embodiment, the hinge cover 230 may be connected to a ground other than the second ground 321*a*, and in this case, the third point P3 may be omitted. In still another embodiment, the hinge cover 230 may operate as a monopole antenna, and in this case, the third point P3 may be omitted.

Figure 4C:
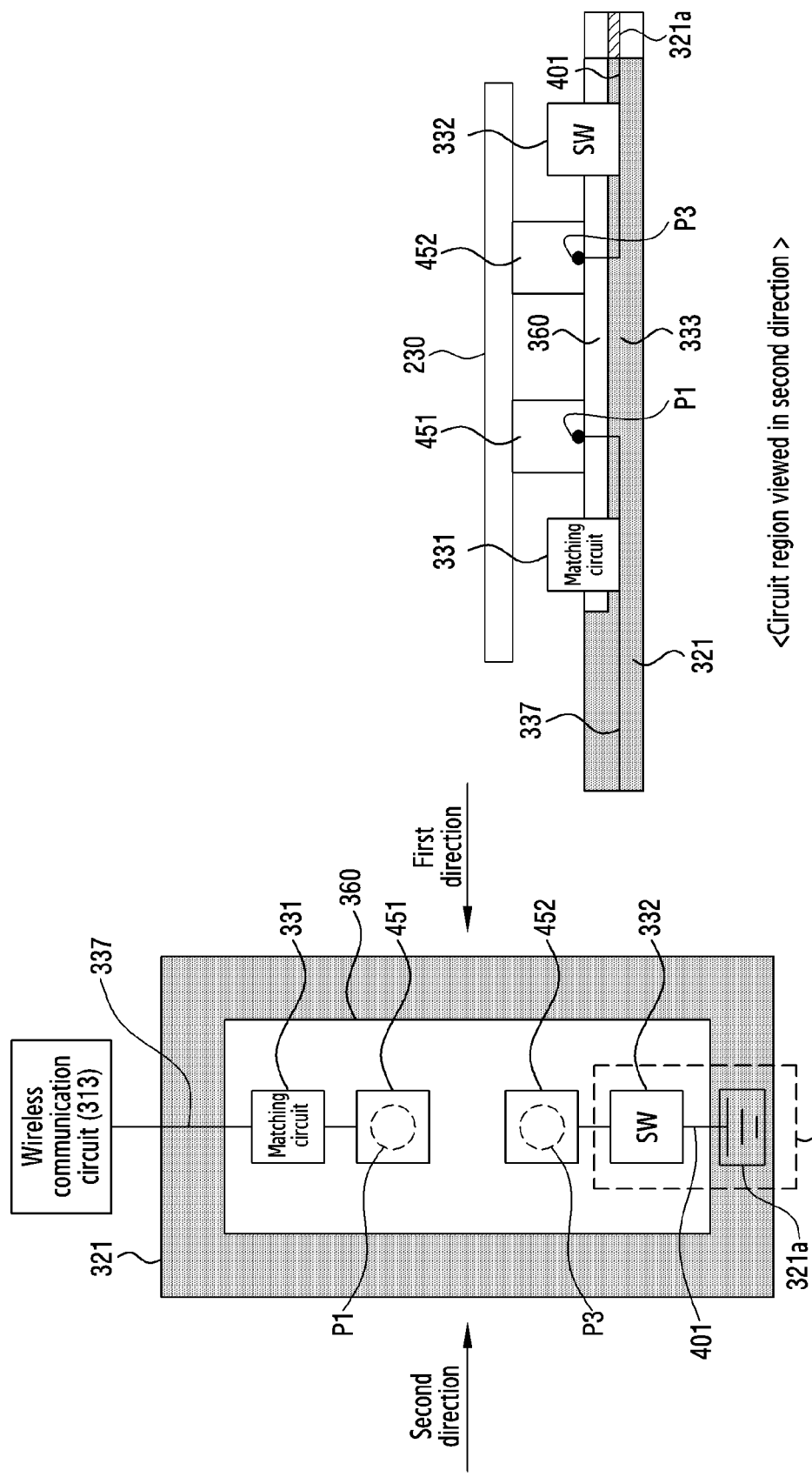
FIG. 4C illustrates a circuit region according to an embodiment.

FIG. 4C illustrates a circuit region according to an embodiment.

Referring to FIGS. 4A and 4C, the enlarged circuit region 360 according to an embodiment shown in FIG. 4A is shown. According to an embodiment, a first conductive connection member 451 may be disposed at a position corresponding to the first point P1 of the first connection member 321. In an embodiment, the wireless communication circuit 313 may feed the hinge cover 230 through the first conductive connection member 451 disposed at the first point P1.

According to an embodiment, a second conductive connection member 452 may be disposed at a position corresponding to the third point P3 of the first connection member 321. In an embodiment, the hinge cover 230 may be electrically connected to the second ground 321*a* through the second conductive connection member 452. For example, the second conductive connection member 452 connected to the hinge cover 230 may be electrically connected to the second ground 321*a* through a sixth transmission line 401, and as a result, the hinge cover 230 may be electrically connected to the second ground 321*a*.

In an embodiment, a first portion 470 is a portion including the switching circuit 332 and the second ground 321*a*. Hereinafter, FIG. 4E illustrates an enlarged first portion 470 to show a connection relationship between the switching circuit 332 and the second ground 321*a*.

Figure 4D:
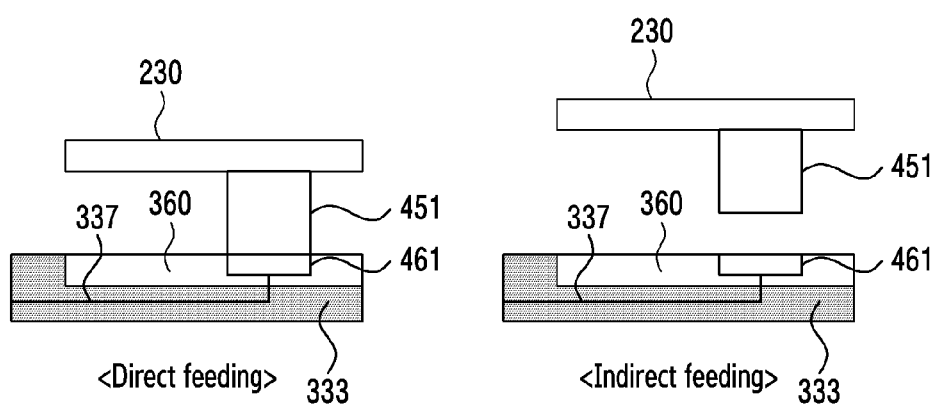
FIG. 4D illustrates various feeding methods according to an embodiment.
Figure 4E:
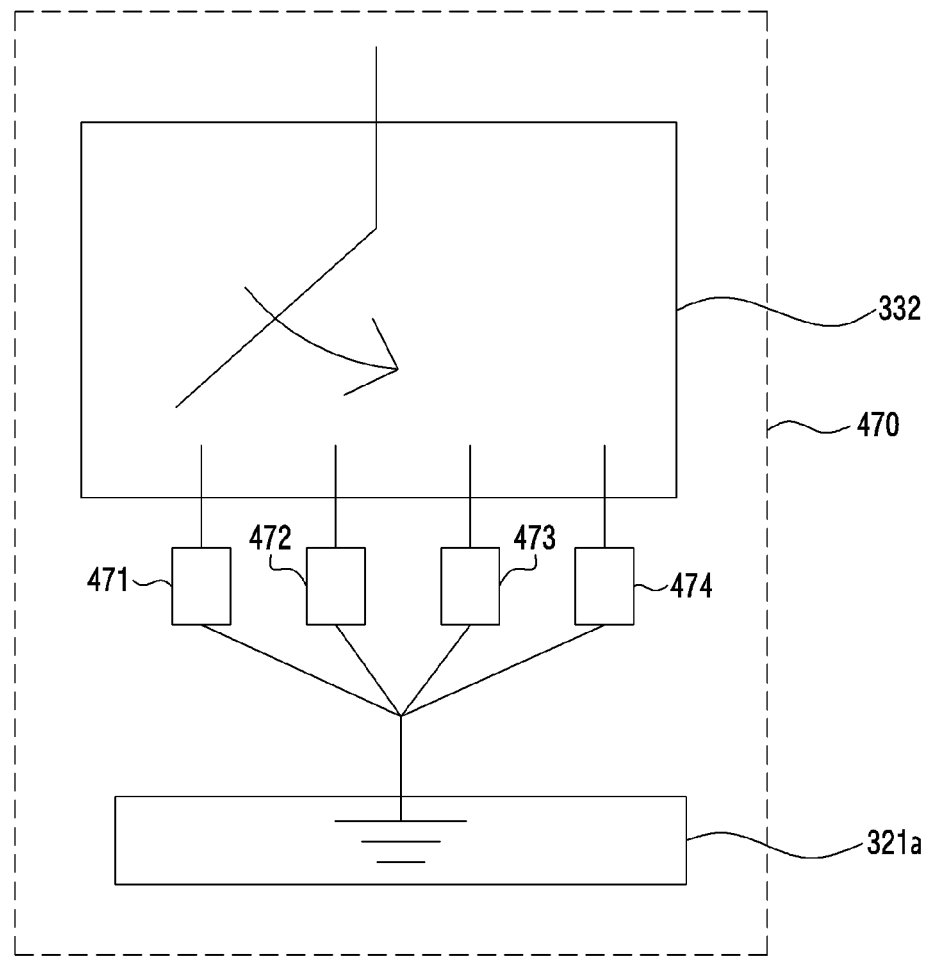
FIG. 4E illustrates a first portion including a switching circuit and a second ground according to an embodiment.

FIG. 4D illustrates various feeding methods according to an embodiment.

Referring to FIG. 4D, the electronic device 101 according to an embodiment may include a feeding pad 461, and the feeding pad 461 may be electrically connected to the third transmission line 337.

According to an embodiment, the wireless communication circuit 313 may feed the hinge cover 230 through the feeding pad 461 and the third transmission line 337. For example, the wireless communication circuit 313 may directly feed the hinge cover 230 through the feeding pad 461 and the third transmission line 337 electrically connected to the first conductive connection member 451.

As another example, the feeding pad 461 may be spaced apart from the first conductive connection member 451 electrically connected to the hinge cover 230 by a specific distance, and the feeding pad 461 and the first conductive connection member 451 may be electromagnetically coupled to each other through coupling. As a result, the wireless communication circuit 313 may indirectly feed the first conductive connection member 451 electrically connected to the hinge cover 230.

FIG. 4E illustrates a first portion including a switching circuit and a second ground according to an embodiment.

Referring to FIG. 4E, the electronic device 101 according to an embodiment may include at least one lumped element (e.g., a capacitor and an inductor) electrically connected to the switching circuit 332. For example, the electronic device 101 may have a first lumped element 471, a second lumped element 472, a third lumped 5 element 473, and/or a fourth lumped element 474 which are electrically connected to the second ground 321*a*.

According to an embodiment, the switching circuit 332 may adjust an electrical connection relationship with the first lumped element 471, the second lumped element 472, the third lumped element 473, and/or the fourth lumped element 474 for the purpose of impedance matching. In other words, the switching circuit 332 may select a proper one of the first lumped element 471, the second lumped element 472, the third lumped element 473, and/or the fourth lumped element 474 for impedance matching.

Figure 5A:
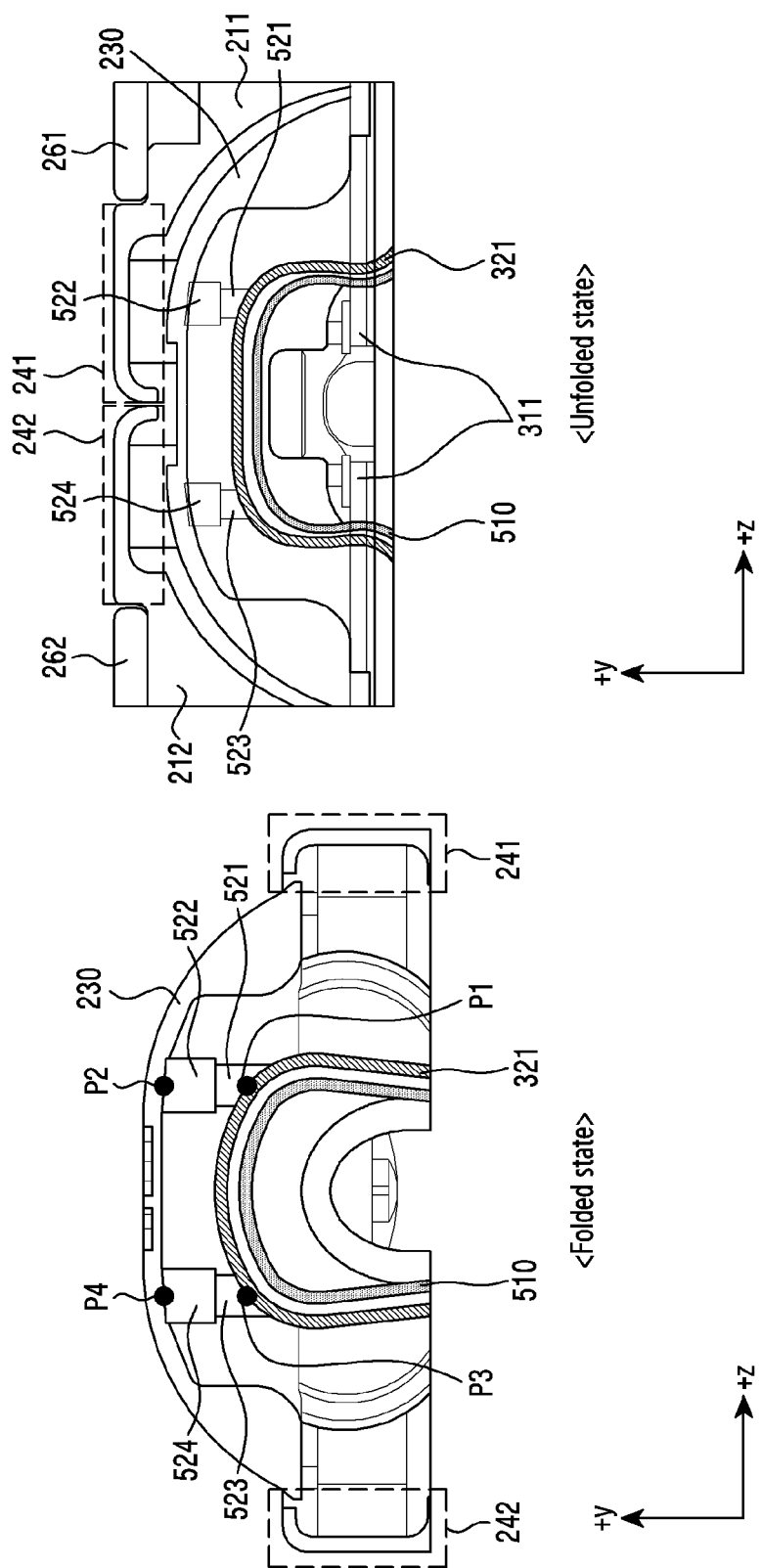
FIG. 5A illustrates the electronic device shown in FIG. 4A when viewed in a second direction according to an embodiment.

FIG. 5A illustrates the electronic device shown in FIG. 4A when viewed in the second direction according to an embodiment.

Referring to FIG. 5A, the electronic device 101 according to an embodiment may include a first conductive connection member 521, a second conductive connection member 522, a third conductive connection member 523, and/or a fourth conductive connection member 524.

In an embodiment, the first conductive connection member 521 may contact the first connection member 321 at the first point P1, and the second conductive connection member 522 electrically connected to the first conductive connection member 521 may be in contact with the second point P2 of the hinge cover 230. Accordingly, the first connection member 321 may be electrically connected to the hinge cover 230 through the first conductive connection member 521 and the second conductive connection member 522. In addition, as described above in FIG. 4A, the first connection member 321 may be electrically connected to the wireless communication circuit 313 of the first printed circuit board 411. For example, in a folded state, the wireless communication circuit 313 may feed the second point P2 of the hinge cover 230 through the first connection member 321, the first conductive connection member 521, and the second conductive connection member 522. Here, the first conductive connection member 521 and the second conductive connection member 522 may correspond to the first conductive connection member 451 in FIG. 4C.

In an embodiment, when the wireless communication circuit 313 feeds the hinge cover 230 in the folded state, the first conductive portion 241 of the first housing 211 and the second conductive portion 242 of the second housing 212 may be electromagnetically connected to the hinge cover 230 through coupling. However, the electrical connection relationship between the hinge cover 230 and both the first conductive portion 241 and the second conductive portion 242 is not limited to the coupling, and in another embodiment, the hinge cover 230 may be electrically connected to both the first conductive portion 241 and the second conductive portion 242 through a separate conductive member (e.g., a C-clip). In still another embodiment, the hinge cover 230 may be electrically connected to the first conductive portion 241 and the second conductive portion 242 through a separate contact structure (e.g., a pogo-pin, and a contact structure using a magnet).

In an embodiment, the processor 120 may control the wireless communication circuit 313 to selectively feed the hinge cover 230 according to the state of the electronic device 101. For example, the processor 120 may control the wireless communication circuit 313 such that power can be supplied to the hinge cover 230 when the electronic device 101 is in a folded state and power cannot be supplied to the hinge cover 230 when the electronic device 101 is in an unfolded state.

According to an embodiment, the third conductive connection member 523 may contact the first connection member 321 at the third point P3, and the fourth conductive connection member 524 electrically connected to the third conductive connection member 523 may contact the fourth point P4 of the hinge cover 230. Accordingly, the first connection member 321 may be electrically connected to the hinge cover 230 through the third conductive connection member 523 and the fourth conductive connection member 524. In addition, as described above in FIG. 4A, the first connection member 321 may be electrically connected to a ground of the second printed circuit board 412. For example, the ground may be electrically connected to the hinge cover 230 through the first connection member 321, the third conductive connection member 523, and the fourth conductive connection member 524 to be used as an antenna ground. Here, the third-sub conductive connection member 523 and the third-sub conductive connection member 524 may correspond to the second conductive connection member 452 in FIG. 4C.

The electronic device 101 according to an embodiment may include a shielding member 510. In an embodiment, the shielding member 510 may block foreign substances introduced into the flexible display 220 when the electronic device 101 is folded or unfolded. The shielding member 510 may include a material having an elastic force (e.g., rubber). In an embodiment, the shielding member 510 may be used as a support member which supports such that the first connection member 321 can be in contact with the first conductive connection member 521 and/or the third conductive connection member 523 when the electronic device 101 is folded or unfolded.

Figure 5B:
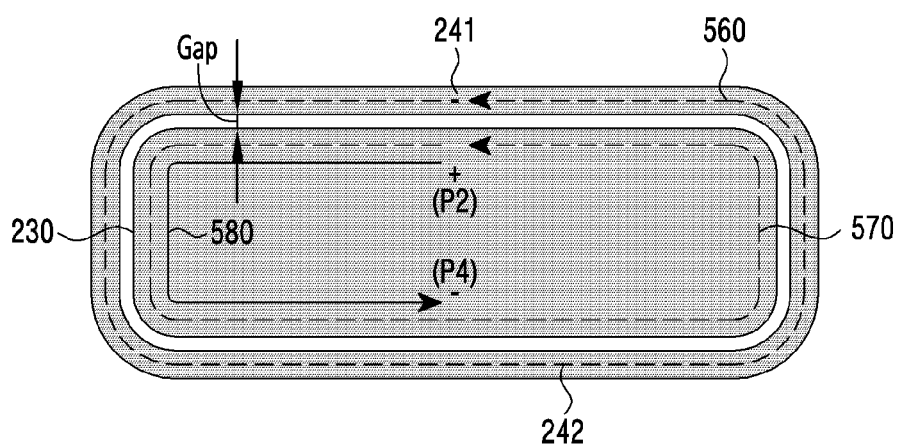
FIG. 5B illustrates an electrical path including a hinge cover, a first conductive portion, and a second conductive portion according to an embodiment.

FIG. 5B illustrates an electrical path including a hinge cover, a first conductive portion, and a second conductive portion according to an embodiment.

Referring to FIG. 5B, a gap may be formed between the hinge cover 230 and the first conductive portion 241 and/or the second conductive portion 242 when the electronic device 101 is in a folded state according to an embodiment.

In an embodiment, the wireless communication circuit 313 may feed the second point P2 of the hinge cover 230. When the wireless communication circuit 313 feeds the second point P2, a potential difference may occur between the hinge cover 230 and the first conductive portion 241 and/or the second conductive portion 242, and a first electrical path 560 including the first conductive portion 241 and/or the second conductive portion 242 may be formed. In an embodiment, in the folded state, the wireless communication circuit 313 may transmit and/or receive an RF signal in a first frequency band, through the first electrical path 560. In an embodiment, the first electrical path 560 may have a loop shape. An electrical length of the first electrical path 560 may correspond to about ½ wavelength ($\lambda/2$) of a wavelength corresponding to the first frequency band.

According to an embodiment, when the wireless communication circuit 313 feeds the hinge cover 230 in the folded state, a second electrical path 570 may be formed along the edge of the hinge cover 230. In an embodiment, the second electrical path 570 may have a loop shape. The wireless communication circuit 313 may transmit and/or receive an RF signal in a second frequency band, through the second electrical path 570. In an embodiment, an electrical length of the second electrical path 570 may correspond to about ¼ wavelength ($\lambda/4$) of a wavelength corresponding to the second frequency band.

According to an embodiment, the wireless communication circuit 313 may transmit and/or receive an RF signal in a third frequency band, through a third electrical path 580 from the second point P2 to the fourth point P4 of the hinge cover 230. In an embodiment, the third electrical path 580 formed between a feeding point (e.g., the second point P2) and a grounding point (e.g., the fourth point P4) of the hinge cover 230 is shown in FIG. 5B, but this is an example. Various electrical paths may be formed depending on a location of the feeding point and/or a location of the grounding point. According to an embodiment, a third frequency band through the third electrical path 580 may correspond to a frequency band higher than each of the first frequency band and the second frequency band. In an embodiment, an electrical length of the third electrical path 580 may correspond to about ¼ wavelength ($\lambda/4$) of a wavelength corresponding to the third frequency band.

Accordingly, the electronic device 101 may secure a multi-frequency band 5 for wireless communication, through the first electrical path 560, the second electrical path 570, and/or the third electrical path 580 while being in a folded state. In addition, as described above in FIG. 4E, the electrical connection relationship with a lumped element (e.g., the first lumped element 471) may be adjusted through the switching circuit 332, and therefore, the electronic device 101 may adjust electrical lengths of the first electrical path 560, the second electrical path 570, and/or the third electrical path 580 and may transmit and/or receive an RF signal in a fourth frequency band, through the adjusted electrical lengths.

Figure 5C:
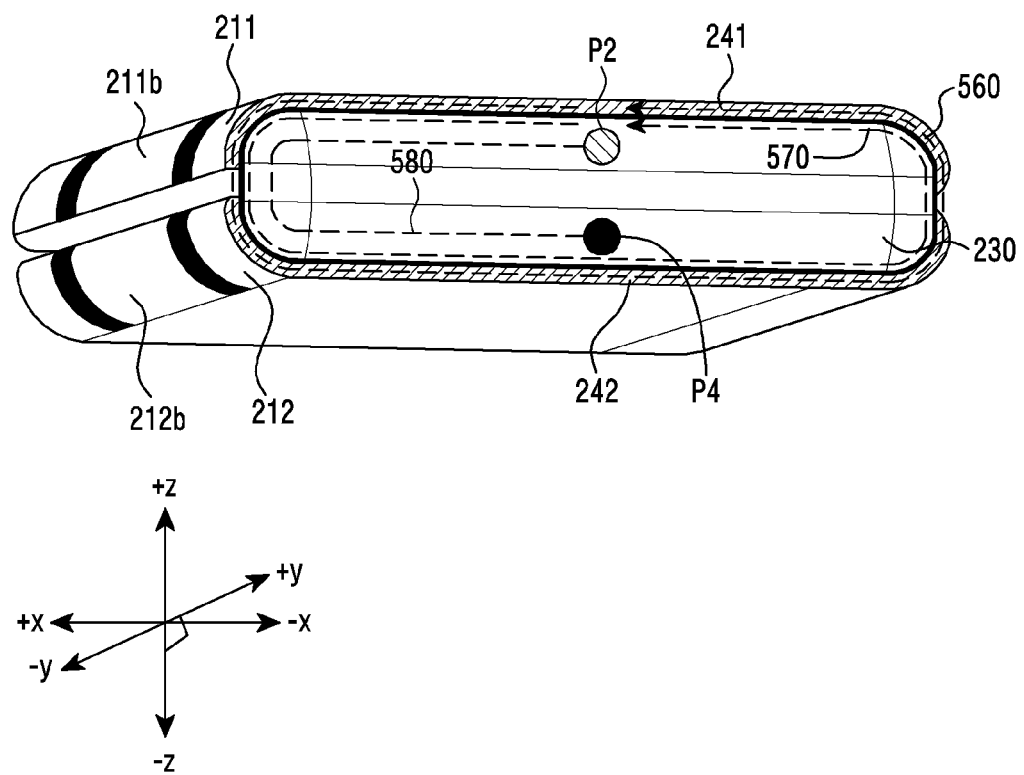
FIG. 5C is a view showing that performance degradation due to interference between antennas is prevented when a hinge cover is used as an antenna radiator, according to an embodiment.

FIG. 5C is a view showing that performance degradation due to interference between antennas is prevented when a hinge cover is used as an antenna radiator, according to an embodiment.

Referring to FIG. 5C, according to an embodiment, the electronic device 101 may reduce or prevent antenna radiation efficiency degradation due to interference between antennas by using the hinge cover 230 exposed to the outside in the folded state as an antenna radiator. For example, when a first side member 211b of the first housing 211 and a second side member 212b of the second housing 212 are used as an antenna radiator, the first side member 211b and the second side member 212b may be in contact with each other or be adjacent to each other within a specific distance in the folded state. Accordingly, when the wireless communication circuit 313 feeds the first side member 211b and the second side member 212b, interference may occur therebetween. On the other hand, when the hinge cover 230 is used as an antenna radiator according to an embodiment, the electronic device 101 may reduce interference caused by another antenna radiator, thereby reducing deterioration in antenna radiation efficiency.

Figure 6:
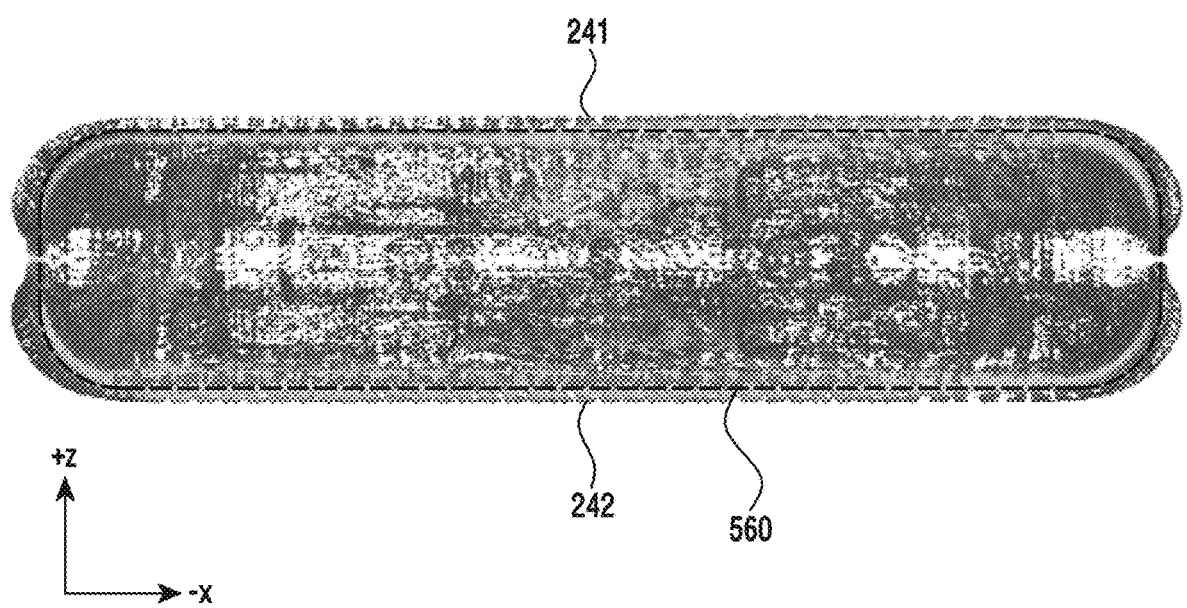
FIG. 6 illustrates a current distribution when a wireless communication circuit feeds one point of a hinge cover, according to an embodiment.

FIG. 6 illustrates a current distribution when a wireless communication circuit feeds one point of a hinge cover, according to an embodiment.

As noted from FIG. 6, the first electrical path 560 may be formed in the first conductive portion 241 and the second conductive portion 242 when the wireless communication circuit 313 according to an embodiment feeds the hinge cover 230.

Figure 7:
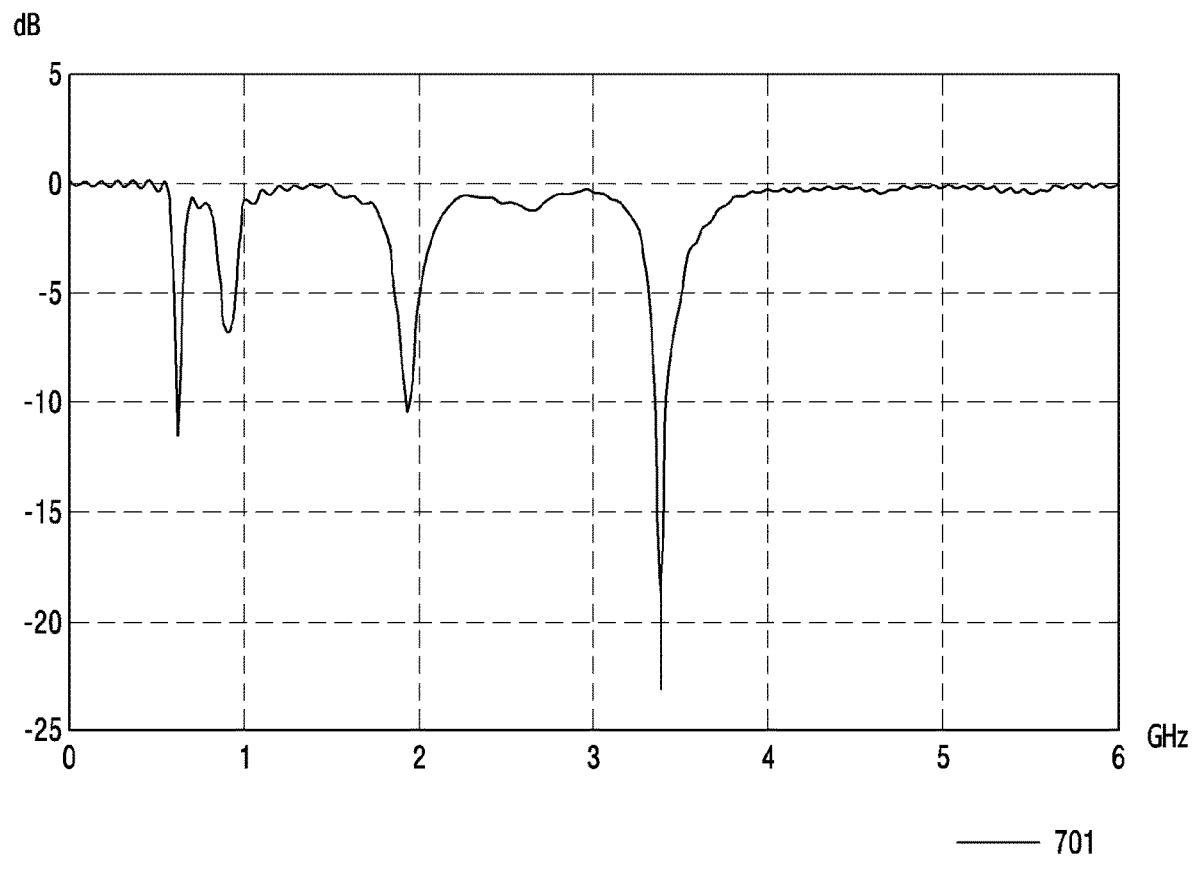
FIG. 7 is a reflection coefficient graph of an antenna when a wireless communication circuit feeds one point of a hinge cover, according to an embodiment.

FIG. 7 is a reflection coefficient graph of an antenna when a wireless communication circuit feeds one point of a hinge cover, according to an embodiment.

Referring to FIG. 7, a first graph 701 according to an embodiment is a reflection coefficient graph when the wireless communication circuit 313 feeds one point of the hinge cover 230. In an embodiment, the first graph 701 has a value of about −10 to about −5 decibels (dB) in a frequency band of about 0.5 to about 0.6 gigahertz (GHz). The first graph 701 has a value of about −7 to about −5 dB in a frequency band of about 0.8 to about 0.9 GHz. In an embodiment, the first frequency band (e.g., about 0.5 to about 0.6 GHz) may correspond to a frequency band of an RF signal that is transmitted and/or received through the first electrical path 560 by the wireless communication circuit 313. In an embodiment, the second frequency band (e.g., about 0.8 to about 0.9 GHz) may correspond to a frequency band of an RF signal that that is transmitted and/or received through the second electrical path 570 by the wireless communication circuit 313. In an embodiment, the electronic device 101 may have a broadband effect when resonance is formed in bands adjacent to each other, such as the first frequency band and the second frequency band.

According to an embodiment, the first graph 701 has a value of about −10 to about −5 dB in a frequency band of about 1.8 to about 2 GHz. The frequency band of about 1.8 to about 2 GHz may correspond to harmonics of the first frequency band (e.g., about 0.8 to about 0.9 GHz).

According to an embodiment, the first graph 701 has a value of about −5 to about −20 dB in a frequency band of about 3.2 to about 3.5 GHz. In an embodiment, the third frequency band (e.g., about 3 to about 4 GHz) may correspond to a frequency band of an RF signal that is transmitted and/or received through the third electrical path 580 by the wireless communication circuit 313. Accordingly, the electronic device 101 may have a relatively high antenna radiation efficiency in the third frequency band compared to other frequency bands.

Figure 8:
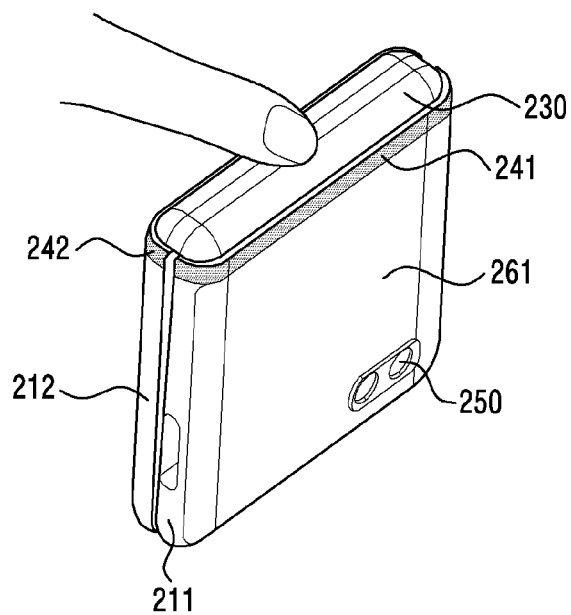
FIG. 8 illustrates an electronic device held by a user, according to an embodiment.

FIG. 8 illustrates an electronic device held by a user, according to an embodiment.

Referring to FIG. 8, the electronic device 101 according to an embodiment may be held by a user in various ways. For example, when the electronic device 101 is gripped by a user, a part (e.g., a finger) of the user's body may be in contact with the hinge cover 230 of the electronic device 101.

Figure 9:
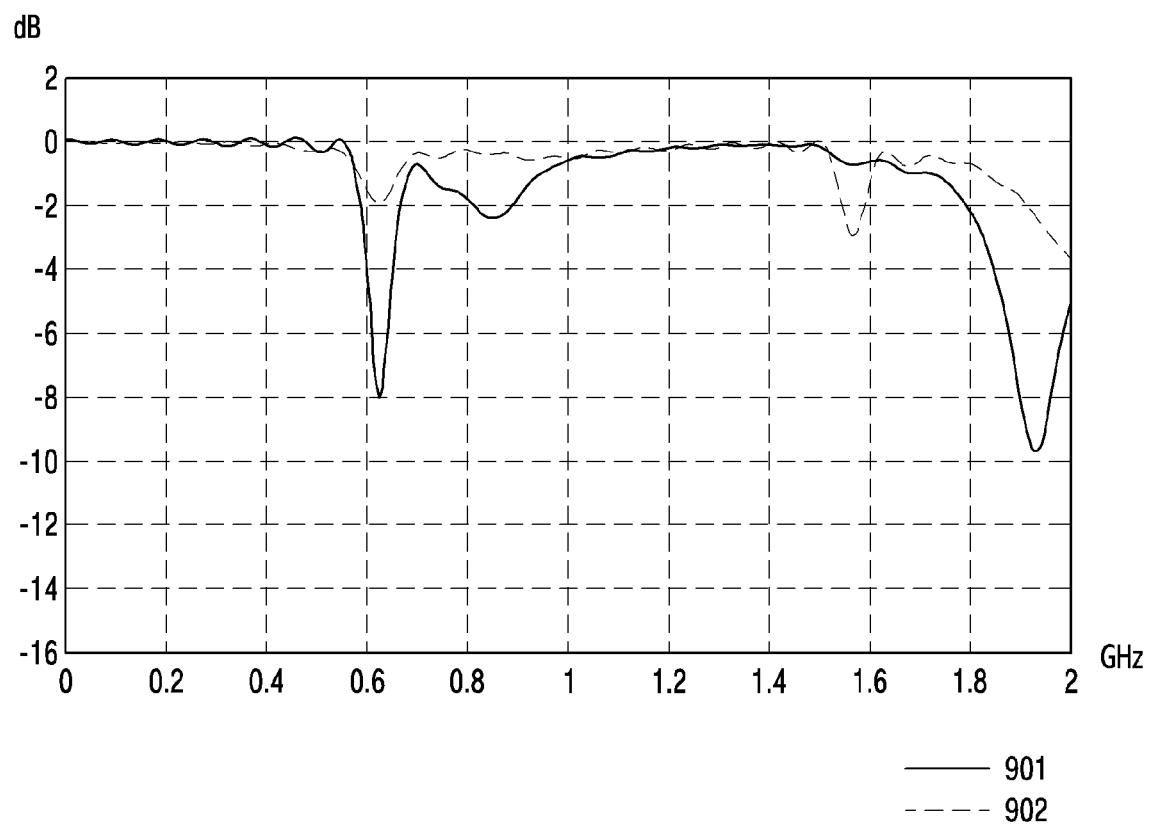
FIG. 9 is a view regarding whether a frequency of an antenna using a hinge cover and a conductive portion shifts when the hinge cover is in contact with a part of the user's body, according to an embodiment.

FIG. 9 is a view regarding whether a frequency of an antenna using a hinge cover and a conductive portion shifts when the hinge cover is in contact with a part of the user's body, according to an embodiment.

Referring to FIG. 9, a first graph 901 according to an embodiment shows a reflection coefficient graph of an antenna including the hinge cover 230, the first conductive portion 241, the second conductive portion 242, when the electronic device 101 is in a folded state and is not in contact with the body. In an embodiment, the second graph 902 shows a reflection coefficient graph of an antenna including the hinge cover 230, the first conductive portion 241, and the second conductive portion 242 when the electronic device 101 is in a folded state and is in contact with a part (e.g., a hand) of the body.

As noted from the first graph 901 and the second graph 902 according to an embodiment, substantially the same resonant frequency band is formed in a frequency band of about 0.5 to about 0.7 GHz. In other words, when the first conductive portion 241 and the second conductive portion 242 as well as the hinge cover 230 are used as an antenna radiator, even though the hinge cover is in contact with the body, the electronic device 101 has substantially the same frequency band (e.g., about 0.5 to about 0.7 GHz) as that before the contact with the body. In an embodiment, the electronic device 101 may prevent a resonant frequency band of the antenna from shifting due to the influence of the body by using the first conductive portion 241 and the second conductive portion 242.

When the antenna resonant frequency band shifts due to the influence of the body, the electronic device 101 may have a received signal strength indicator (RSSI) value which is decreased in a desired frequency band (e.g., about 0.5 to about 0.7 GHz) for the antenna to operate. However, the electronic device 101 according to an embodiment may prevent the RSSI value from decreasing in the desired frequency band (e.g., about 0.5 to about 0.7 GHz) for the antenna to operate by using the first conductive portion 241 and the second conductive portion 242 as an antenna radiator.

Figure 10:
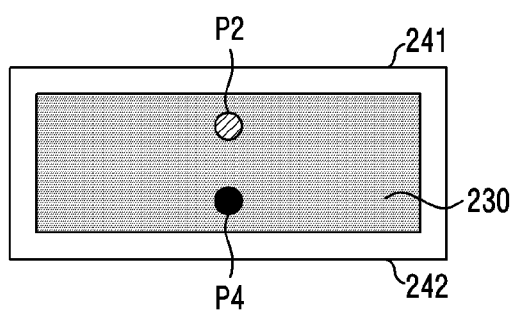
FIG. 10 is a conceptual diagram and an equivalent diagram each illustrating a hinge cover, a first conductive portion, and a second conductive portion according to an embodiment.
Figure 10:
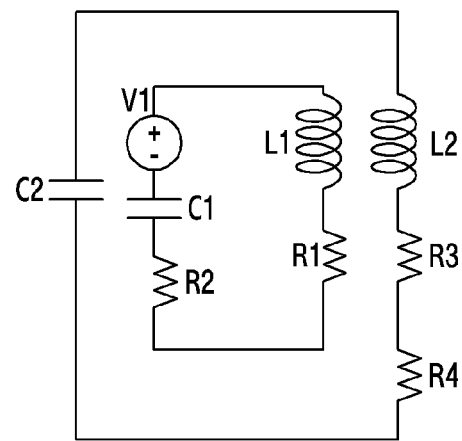

FIG. 10 is a conceptual diagram and an equivalent diagram each illustrating a hinge cover, a first conductive portion, and a second conductive portion according to an embodiment.

Referring to FIG. 10, the hinge cover 230 according to an embodiment may be represented by a first resistor R1, a second resistor R2, a first capacitor C1, and/or a first inductor L1. In an embodiment, the first resistor R1 and the second resistor R2 may refer to resistance of a conductive material (e.g., aluminum) forming the hinge cover 230. A frequency characteristic of an antenna including the hinge cover 230 may be represented through a capacitance value of the first capacitor C1 and an inductance value of the first inductor L1.

According to an embodiment, the first conductive portion 241 of the first housing 211 and the second conductive portion 242 of the second housing 212 may be represented by a third resistor R3, a fourth resistor R4, a second capacitors C2, and/or a second inductor L2. In an embodiment, the third resistor R3 and the fourth resistor R4 may refer to resistance of a conductive material (e.g., aluminum) forming the first conductive portion 241 and the second conductive portion 242. A frequency characteristic of the antenna including the first conductive portion 241 and the second conductive portion 242 may be represented through a capacitance value of the second capacitor C2 and an inductance value of the second inductor L2.

Figure 11:
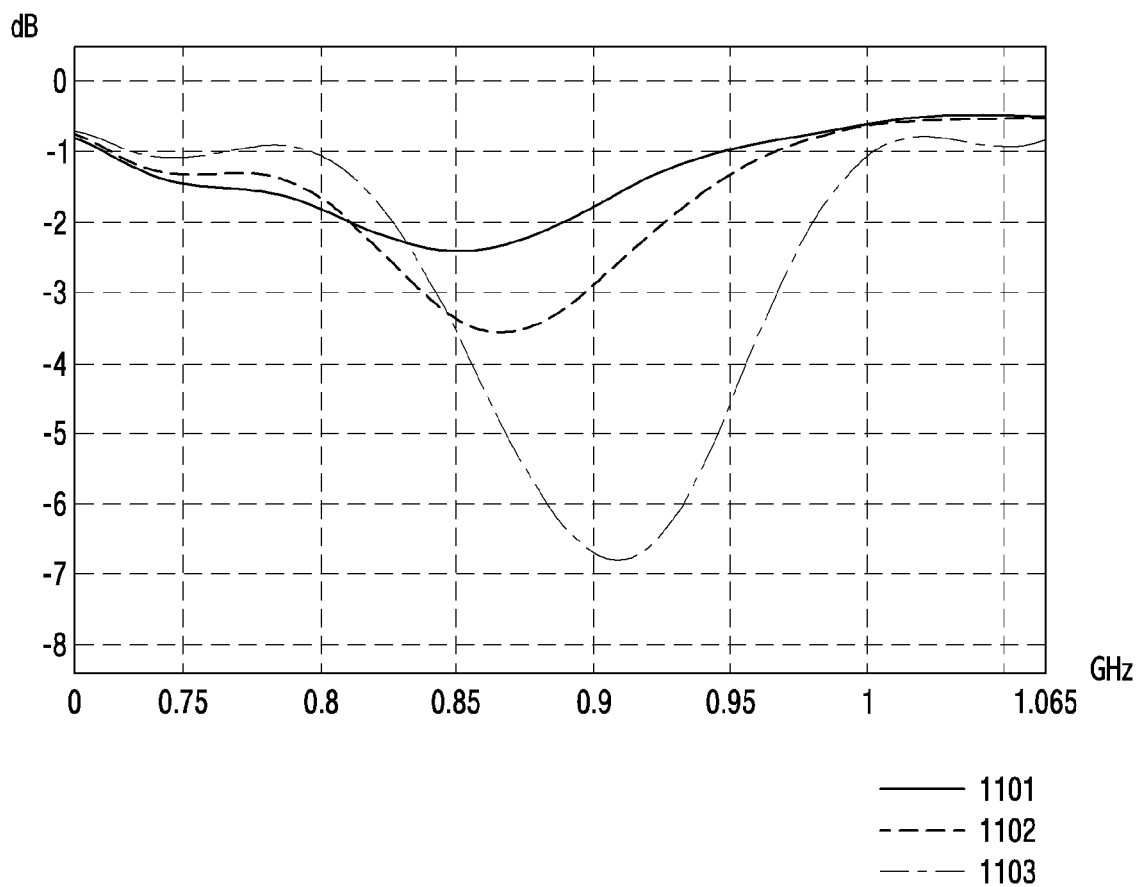
FIG. 11 shows a graph resulting from a change in an electrical path formed when a wireless communication circuit transmits and receives RF signal through the switch circuit of FIG. 4E, according to an embodiment.

FIG. 11 shows a graph resulting from a change in an electrical path formed when a wireless communication circuit transmits and receives RF signal through the switch circuit of FIG. 4E according to an embodiment.

Referring to FIG. 11, a first graph 1101 according to an embodiment is a reflection coefficient graph when the electrical path has a first electrical length (A1). A second graph 1102 is a reflection coefficient graph when the electrical path has a second electrical length (A2). A third graph 1103 is a reflection coefficient graph when the electrical path has a third electrical length (A3). In an embodiment, the first electrical length (A1) may be longer than the second electrical length (A2), and the second electrical length (A2) may be longer than the third electrical length (A3).

According to an embodiment, compared to the second graph 1102, the first graph 1101 shows a resonance frequency in a lower frequency band, and compared to the third graph 1103, the second graph 1102 shows a resonance frequency in a lower frequency band. Accordingly, the electronic device 101 may transmit and/or receive an RF signal in a multi-frequency band under the control of the switch circuit 1110.

Figure 12:
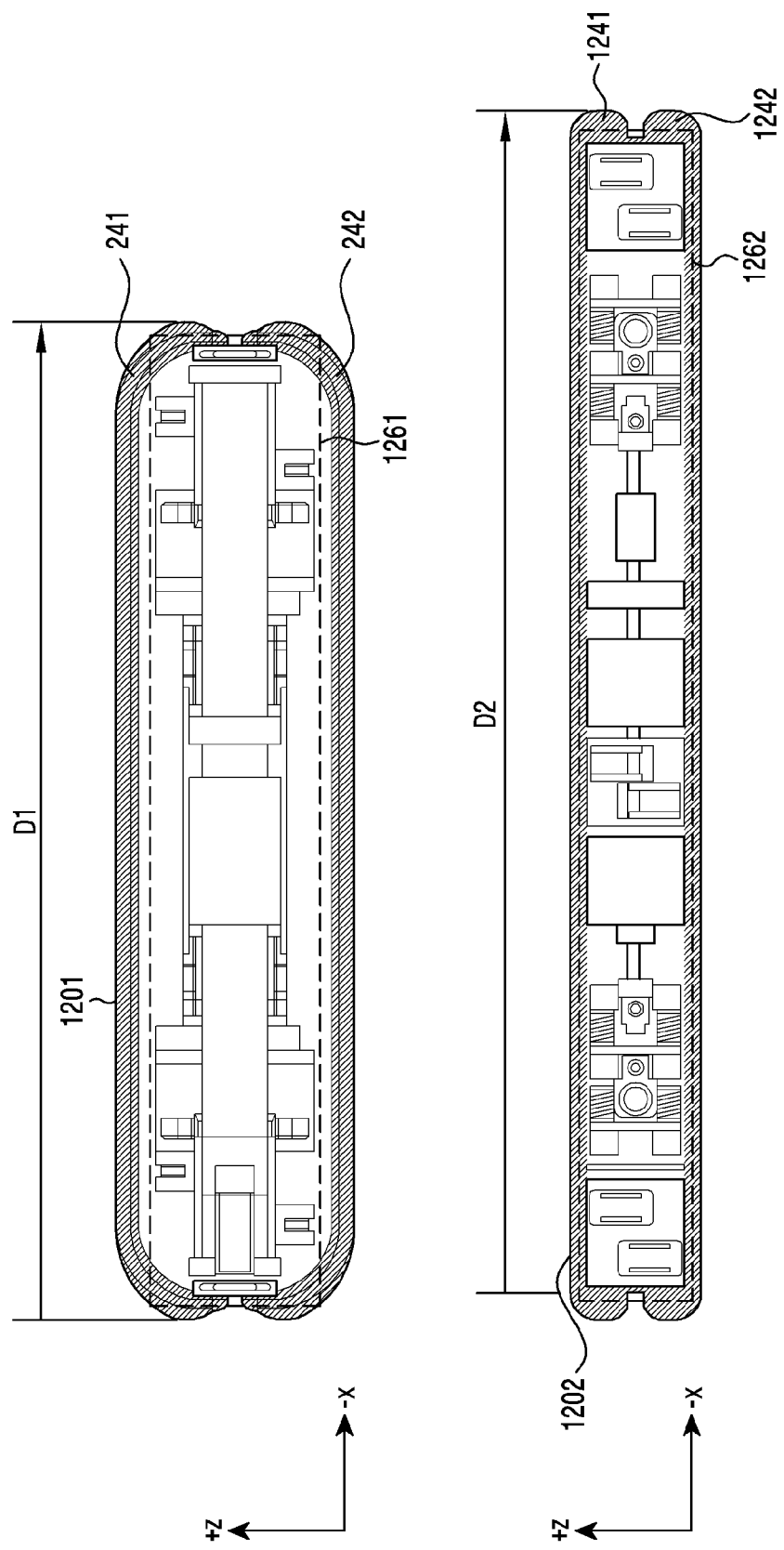
FIG. 12 illustrates an electrical path of an electronic device according to various embodiments.

FIG. 12 illustrates an electrical path of an electronic device according to various embodiments.

Referring to FIG. 12, a second electronic device 1202 (e.g., the electronic device 101 of FIG. 2) according to an embodiment may have a longer length in the horizontal direction (e.g., the x-axis direction) compared to a first electronic device 1201 (e.g., the electronic device 101 of FIG. 2). For example, the first electronic device 1201 of FIG. 2 may have a first physical length D1. The second electronic device 1202 may have a second physical length D2 that is longer than the first physical length D1 in the x direction.

According to an embodiment, when the second electronic device 1202 has a longer physical length (e.g., the second physical length D2) than the first electronic device 1201, a second electrical path 1262 of the second electronic device 1202 may be longer than a first electrical path 1261 of the first electronic device 1201. The second electrical path 1262 may refer to an electrical path formed along the third conductive portion 1241 and the fourth conductive portion 1242 of the second electronic device 1202.

Accordingly, the second electronic device 1202 may transmit and/or receive an RF signal in a frequency band relatively lower than that of the first electronic device 1201, through the second electrical path 1262.

For convenience of explanation, in the above description, the first electronic device 1201 and the second electronic device 1202 transmit and/or receive an RF signal in a relatively low frequency band when the physical lengths thereof are increased. In practice, however, the electrical path and electrical length may vary according to an impedance matching circuit, a lumped element, and/or a segment, and accordingly, a frequency band of an RF signal transmitted/received by the second electronic device 1202 may vary.

An electronic device 101 according to various embodiments of the disclosure may include a housing 210 including a first housing 211 and a second housing 212, a flexible display 220 disposed in the housing 210, a hinge structure 311 disposed in an inner space of the electronic device 101, a hinge cover 230, and a wireless communication circuit 313 disposed in the inner space of the electronic device 101, the housing 210 and the flexible display 220 may form the inner space of the electronic device 101, the hinge structure 311 may connect the first housing 211 and the second housing 212 to each other such that the first housing 211 is rotatable about a first axis with respect to the second housing 212, the hinge cover 230 may be positioned opposing the flexible display 220 with respect to the hinge structure 311 when the housing 210 is in a folded state, and may cover at least portion of the hinge structure 311, the first housing 211 may include a first conductive portion 241 corresponding to a first edge 211a parallel to and adjacent to a first axis, the second housing 212 may include a second conductive portion 242 corresponding to a second edge 212a parallel to and adjacent to the first axis, in a state in which the housing 210 is folded, the hinge cover 230 may be exposed to the outside of the electronic device 101 by a first width while being disposed between the first edge 211a of the first housing 211 and the second edge 212a of the second housing 212, in a state in which the housing 210 is unfolded, the first edge 211a of the first housing 211 and the second edge 212a of the second housing 212 may be in contact with each other or be adjacent to each other within a specific distance shorter than the first width, the hinge cover 230 may be positioned between the housing 210 and the hinge structure 311, and in the folded state, the wireless communication circuit 313 may feed a first point of the hinge cover 230 and may transmit and/or receive a signal in a first frequency band, through a first electrical path 560 formed in the first conductive portion 241 and/or the second conductive portion 242 by feeding.

According to an embodiment, when the wireless communication circuit 313 feeds the first point of the hinge cover 230 in the folded state, the hinge cover 230 may be electrically connected to the first conductive portion 241 of the first housing 211 and/or the second conductive portion 242 of the second housing 212 through coupling.

According to an embodiment, the flexible display 220 may have a first region 221 corresponding to the first housing 211 and a second region 222 corresponding to the second housing which face each other in the folded state, and in the unfolded state, the first region 221 and the second region 222 may be exposed to the outside of the electronic device 101 while facing in an identical direction.

According to an embodiment, the first frequency band may include about 0.5 to about 1 GHz.

According to an embodiment, in the folded state, the wireless communication circuit 313 may transmit and/or receive a signal in a second frequency band, through a second electrical path 570 including the hinge cover 230.

According to an embodiment, the second frequency band may include about 3.3 to about 3.5 GHz.

The electronic device 101 according to an embodiment may further include a first printed circuit board 411 positioned in the first housing 211, a second printed circuit board 412 positioned in the second housing 212, and a connection member (e.g., the first connection member 321 of FIG. 3), and the first connection member 321 may be disposed between the hinge cover 230 and the hinge structure 311 and electrically connect the first printed circuit board 411 and the second printed circuit board 412 to each other.

According to an embodiment, the electronic device may further include a conductive connection member (e.g., the first conductive connection member 451 of FIG. 4C), and the conductive connection member may be in contact with the connection member at a second point (e.g., P3) and extend from the second point (e.g., P3) to the hinge cover 230 to be in contact with the hinge cover 230.

According to an embodiment, the connection member (e.g., the first connection member 321 of FIG. 3) may include a flexible RF cable (FRC).

According to an embodiment, the electronic device may further include a lumped element electrically connected to the hinge cover 230, and the wireless communication circuit 313 may transmit and/or receive a signal in a fourth frequency band, through a fourth electrical path including the lumped element and the hinge cover 230.

According to an embodiment, the electronic device may further include a switch circuit 1110 electrically connected to the lumped element, and the switch circuit 1110 may control the electrical connection between the lumped element and the hinge cover 230.

According to an embodiment, an electrical length of the first electrical path 560 may correspond to about ½ wavelength (λ/2) of a wavelength corresponding to the first frequency band.

According to an embodiment, the electronic device may further include at least one processor 120 electrically connected to the wireless communication circuit 313, and the at least one processor 120 may feed the hinge cover 230 by controlling the wireless communication circuit 313 when the housing 210 is in the folded state. The electronic device 101 according to an embodiment may further include a rear cover 260 forming at least a portion of a rear surface of the electronic device 101, and the rear cover 260 may include a non-conductive material.

According to an embodiment, the first conductive portion 241 of the first housing 211 and the second conductive portion 242 of the second housing 212 may form a loop structure in the folded state.

An electronic device 101 according to various embodiments of the disclosure may include a metal housing (e.g., the housing 210) including a second metal housing (e.g., the first housing 211) and a second metal housing (e.g., the second housing 212), a flexible display 220 disposed in the metal housing, a hinge structure 311 disposed in an inner space of the electronic device 101, a hinge cover 230, and a wireless communication circuit 313 disposed in the inner space of the electronic device 101, the metal housing (e.g., the housing 210) and the flexible display 220 may form the inner space of the electronic device 101, the hinge structure 311 may connect the first metal housing (e.g., the first housing 211) and the second metal housing (e.g., the second housing 212) to each other such that the first metal housing (e.g., the first housing 211) is rotatable about a first axis with respect to the second metal housing (e.g., the second housing 212), the hinge cover 230 may be positioned, with respect to the hinge structure 311, in a second direction opposite to a first direction facing toward the flexible display 220 from the hinge structure 311 and may cover at least a portion of the hinge structure 311, the first metal housing (e.g., the first housing 211) may include a first portion (e.g., the first conductive portion 241) corresponding to a first edge 211a adjacent to the first axis, the second metal housing (e.g., the second housing 212) may include a second portion (e.g., the second conductive portion 242) corresponding to a second edge 212a adjacent to the first axis, in a state in which the metal housing (e.g., the housing 210) is folded, the hinge cover 230 may be exposed to the outside of the electronic device 101 by a first width while being disposed between the first edge 211a of the first metal housing (e.g., the first housing 211) and the second edge 212a of the second metal housing (e.g., the second housing 212), in a state in which the metal housing (e.g., the housing 210) is unfolded, the first edge 211a of the first metal housing (e.g., the first housing 211) and the second edge 212a of the second metal housing (e.g., the second housing 212) may be in contact with each other or adjacent to each other within a specific distance shorter than the first width, the hinge cover 230 may be positioned between the metal housing (e.g., the housing 210) and the hinge structure 311, in the folded state, the wireless communication circuit 313 may feed one point of the hinge cover 230 and transmit and/or receive a signal in a first frequency band, through a first electrical path 560 formed in the first portion (e.g., the first conductive portion 241) and/or the second portion (e.g., the second conductive portion 242) according to the feeding, and may transmit and/or receive a signal in a second frequency band, through a second electrical path 570 including the hinge cover 230.

According to an embodiment, when the wireless communication circuit 313 feeds the one point of the hinge cover 230 in the folded state, the first portion (e.g., the first conductive portion 241) of the first metal housing (e.g., the first housing 211) and/or the second portion (e.g., the second conductive portion 242) of the second metal housing (e.g., the second housing 212) may be electrically connected to the hinge cover 230 through coupling.

According to an embodiment, the first frequency band may include about 0.5 to about 1 GHz, and the second frequency band may include about 3.3 to about 3.5 GHz.

According to an embodiment, the electronic device may further include a lumped element electrically connected to the hinge cover 230, and the wireless communication circuit 313 may transmit and/or receive a signal in a fourth frequency band, through a fourth electrical path including the lumped element and the hinge cover 230.

According to an embodiment, the electronic device may further include a switch circuit 1110 electrically connected to the lumped element, and the switch circuit 1110 may control the electrical connection between the lumped element and the hinge cover 230.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit ("ASIC").

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory ("CD-ROM")), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
a housing including a first housing and a second housing;
a flexible display disposed in the housing, the housing and the flexible display forming an inner space of the electronic device;
a hinge structure disposed in the inner space of the electronic device, the hinge structure being configured to connect the first housing and the second housing such that the first housing is rotatable about a first axis with respect to the second housing;
a hinge cover positioned opposing the flexible display with respect to the hinge structure when the housing is in a folded state, the hinge cover being configured to cover at least portion of the hinge structure; and
a wireless communication circuit disposed in the inner space of the electronic device,
wherein the first housing includes a first conductive portion formed along a first edge of the first housing parallel to the first axis and adjacent to the first axis,
wherein the second housing includes a second conductive portion formed along a second edge of the second housing parallel to the first axis and adjacent to the first axis,
wherein when the housing is in the folded state:
the hinge cover is exposed to an outside of the electronic device by a first width between the first edge of the first housing and the second edge of the second housing, and the first conductive portion and the second conductive portion form a loop structure surrounding the hinge cover,
wherein when the housing is in an unfolded state:
the first edge of the first housing and the second edge of the second housing are in contact or adjacent to each other within a specific distance shorter than the first width, and
the hinge cover is positioned between the housing and the hinge structure, and
wherein, in the folded state, the wireless communication circuit is configured to feed a first point of the hinge cover and transmit and/or receive a signal in a first frequency band, through a first electrical path formed in the loop structure formed by the first conductive portion and the second conductive portion by the feeding.

2. The electronic device of claim 1, wherein, as the wireless communication circuit feeds the first point of the hinge cover in the folded state, the hinge cover is electrically connected to the first conductive portion of the first housing and/or the second conductive portion of the second housing through coupling.

3. The electronic device of claim 1, wherein the flexible display:
includes a first region corresponding to the first housing and a second region corresponding to the second housing, which face each other in the folded state, and
the first region and the second region are exposed to the outside of the electronic device while facing in an identical direction in the unfolded state.

4. The electronic device of claim 1, wherein the first frequency band comprises 0.5 to 1 gigahertz (GHz).

5. The electronic device of claim 1, wherein in the folded state, the wireless communication circuit is configured to transmit and/or receive a signal in a second frequency band, through a second electrical path comprising the hinge cover.

6. The electronic device of claim 5, wherein the second frequency band comprises about 3.3 to about 3.5 GHz.

7. The electronic device of claim 1, further comprising:
a first printed circuit board positioned in the first housing;
a second printed circuit board positioned in the second housing; and
a first connection member,
wherein the first connection member is disposed between the hinge cover and the hinge structure and configured to electrically connect the first printed circuit board and the second printed circuit board.

8. The electronic device of claim 7, further comprising a conductive connection member,
wherein the conductive connection member:
is in contact with the first connection member at a second point, and
extends from the second point to the hinge cover to be in contact with the hinge cover.

9. The electronic device of claim 7, wherein the connection member comprises a flexible RF cable (FRC).

10. The electronic device of claim 1, further comprising a lumped element electrically connected to the hinge cover,
wherein the wireless communication circuit is configured to transmit and/or receive a signal in a second frequency band, through a second electrical path comprising in the lumped element and the hinge cover.

11. The electronic device of claim 10, further comprising a switch circuit electrically connected to the lumped element,
wherein the switch circuit is configured to control an electrical connection between the lumped element and the hinge cover.

12. The electronic device of claim 1, wherein an electrical length of the first electrical path corresponds to ½ wavelength ($\lambda/2$) of a wavelength corresponding to the first frequency band.

13. The electronic device of claim 1, further comprising at least one processor electrically connected to the wireless communication circuit,
wherein the at least one processor is configured to feed the hinge cover by controlling the wireless communication circuit when the housing is in the folded state.

14. The electronic device of claim 1, further comprising a rear cover forming at least a portion of a rear surface of the electronic device,
wherein the rear cover comprises a non-conductive material.

15. An electronic device comprising:
a metal housing including a first metal housing and a second metal housing;
a flexible display disposed in the metal housing, the metal housing and the flexible display forming an inner space of the electronic device;
a hinge structure disposed in the inner space of the electronic device, the hinge structure being configured to connect the first metal housing and the second metal housing such that the first metal housing is rotatable about a first axis with respect to the second metal housing;
a hinge cover positioned, with respect to the hinge structure, in a second direction opposite to a first direction facing toward the flexible display from the hinge structure, the hinge cover being configured to cover at least a portion of the hinge structure; and
a wireless communication circuit disposed in the inner space of the electronic device,
wherein the first metal housing includes a first portion formed along a first edge of the first metal housing adjacent to the first axis,
wherein the second metal housing includes a second portion formed along a second edge the second metal housing adjacent to the first axis,
wherein when the metal housing is in the folded state:
the hinge cover is exposed to an outside of the electronic device by a first width between the first edge of the first metal housing and the second edge of the second metal housing, and the first portion and the second portion form a loop structure surrounding the hinge cover,
wherein when the metal housing is in an unfolded state:
the first edge of the first metal housing and the second edge of the second metal housing are in contact or adjacent to each other within a specific distance shorter than the first width,
the hinge cover is positioned between the metal housing and the hinge structure, and
wherein, in the folded state, the wireless communication circuit is configured to:
feed one point of the hinge cover and receive a signal in a first frequency band, through a first electrical path formed in the loop structure formed by the first portion and the second portion by the feeding, and
transmit and/or receive a signal in a second frequency band, through a second electrical path comprising the hinge cover.

16. The electronic device of claim 15, wherein, as the wireless communication circuit feeds the one point of the hinge cover in the folded state, the first portion of the first metal housing and/or the second portion of the second metal housing are electrically connected to the hinge cover through coupling.

17. The electronic device of claim 15, wherein the first frequency band comprises 0.5 to 1 GHz, and the second frequency band comprises 3.3 to 3.5 GHz.

18. The electronic device of claim 15, further comprising a lumped element electrically connected to the hinge cover,
wherein the wireless communication circuit is configured to transmit and/or receive a signal in a third frequency band, through a third electrical path comprising the lumped element and the hinge cover.

19. The electronic device of claim 18, further comprising a switch circuit electrically connected to the lumped element,
wherein the switch circuit is configured to control an electrical connection between the lumped element and the hinge cover.

* * * * *